United States Patent
Oh et al.

(10) Patent No.: US 11,956,816 B2
(45) Date of Patent: Apr. 9, 2024

(54) METHOD AND DEVICE FOR DETERMINING TRANSMISSION TIME IN WIRELESS COMMUNICATION SYSTEM

(71) Applicant: Samsung Electronics Co., Ltd., Suwon-si (KR)

(72) Inventors: Jinyoung Oh, Suwon-si (KR); Jeongho Yeo, Suwon-si (KR); Hyunseok Ryu, Suwon-si (KR); Sungjin Park, Suwon-si (KR); Jonghyun Bang, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 17/425,020

(22) PCT Filed: Jan. 3, 2020

(86) PCT No.: PCT/KR2020/000146
§ 371 (c)(1),
(2) Date: Jul. 22, 2021

(87) PCT Pub. No.: WO2020/153624
PCT Pub. Date: Jul. 30, 2020

(65) Prior Publication Data
US 2022/0095371 A1 Mar. 24, 2022

(30) Foreign Application Priority Data

Jan. 22, 2019 (KR) .................. 10-2019-0008348
Oct. 30, 2019 (KR) .................. 10-2019-0136908

(51) Int. Cl.
*H04W 74/08* (2009.01)
*H04L 27/26* (2006.01)
(Continued)

(52) U.S. Cl.
CPC ......... *H04W 74/08* (2013.01); *H04L 27/2607* (2013.01); *H04W 72/12* (2013.01); *H04W 74/002* (2013.01)

(58) Field of Classification Search
None
See application file for complete search history.

(56) References Cited

U.S. PATENT DOCUMENTS

2018/0220458 A1* 8/2018 Ouchi ................. H04L 27/01
2019/0173646 A1* 6/2019 Wu .................... H04L 25/0224
(Continued)

FOREIGN PATENT DOCUMENTS

KR 10-2018-0084669 A 7/2018
WO 2018/062845 A1 4/2018
(Continued)

OTHER PUBLICATIONS

NTT DOCOMO, Inc., "HARQ enhancement for NR-U", R1-1900955, 3GPP TSG RAN WG11 Ad-Hoc Meeting 1901, aipei, Taiwan, See sections 1-2.2, Jan. 12, 2019 (Year: 2019).*
(Continued)

*Primary Examiner* — Faiyazkhan Ghafoerkhan
(74) *Attorney, Agent, or Firm* — Jefferson IP Law, LLP

(57) ABSTRACT

The disclosure provides a communication method in a wireless system, the communication method including performing a channel access procedure in an unlicensed band, determining a processing time of a user equipment (UE), based on whether to apply a cyclic-extended signal, after completion of the channel access procedure, transmitting, via a downlink (DL) control channel, scheduling information about uplink (UL) transmission determined based on the processing time, and receiving, from the UE, a control channel or a data channel.

19 Claims, 13 Drawing Sheets

(51) Int. Cl.
*H04W 72/12* (2023.01)
*H04W 74/00* (2009.01)

(56) References Cited

U.S. PATENT DOCUMENTS

| | | | | |
|---|---|---|---|---|
| 2019/0229964 A1* | 7/2019 | Ouchi | .................... | H04L 5/0051 |
| 2019/0364603 A1* | 11/2019 | Qian | .................... | H04L 27/2605 |
| 2019/0373560 A1* | 12/2019 | Ouchi | .................... | H04W 72/23 |
| 2020/0037385 A1* | 1/2020 | Park | .................... | H04W 56/001 |
| 2020/0068435 A1* | 2/2020 | Zhang | .................. | H04L 27/2605 |
| 2020/0413463 A1* | 12/2020 | Ouchi | .................... | H04L 5/0032 |
| 2021/0218542 A1* | 7/2021 | Ohuchi | ................. | H04L 1/1861 |
| 2022/0095371 A1* | 3/2022 | Oh | ...................... | H04L 27/2607 |

FOREIGN PATENT DOCUMENTS

| | | | | |
|---|---|---|---|---|
| WO | WO-2018062845 A1 * | 4/2018 | ........... | H04B 7/0695 |
| WO | 2018/203611 A1 | 11/2018 | | |

OTHER PUBLICATIONS

NTT DOCOMO, Inc., "HARQ enhancement for NR-U", R1-1900955, 3GPP TSG RAN WG1 Ad-Hoc Meeting 1901, Taipei, Taiwan, See sections 1-2.2, Jan. 12, 2019.

Qualcomm Incorporated, "Processing Timeline Enhancements for eURLLC", R1-1901314, 3GPP TSG-RAN WG1 AH-1901, Taipei, Taiwan, See sections 2, Jan. 21, 2019.

* cited by examiner

METHOD AND DEVICE FOR DETERMINING TRANSMISSION TIME IN WIRELESS COMMUNICATION SYSTEM

TECHNICAL FIELD

The disclosure relates to a wireless communication system, and more particularly, to a method and device for deciding a transmission time in a wireless communication system.

BACKGROUND ART

To meet increasing demand with respect wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems.

To achieve high data rates, implementation of 5G communication systems in an ultra-high frequency or millimeter-wave (mmWave) band (e.g., a 60-gigahertz (GHz) band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied.

To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multicarrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication technologies such as sensor networks, M2M communication, MTC, and the like is being implemented by using techniques including beamforming, MIMO, array antennas, and the like. Application of cloud radio access network (Cloud-RAN) as the above-described big data processing technology may be an example of convergence of 5G communication technology and IoT technology.

As various services can be provided due to the aforementioned technical features and development of wireless communication systems, there is a demand for a method for seamlessly providing the services.

DESCRIPTION OF EMBODIMENTS

Technical Problem

Embodiments of the disclosure provide a device and method for effectively providing a service in a mobile communication system.

Solution to Problem

Embodiments of the disclosure provide a method and device for deciding a transmission time by determining a processing time in a mobile communication system.

Advantageous Effects of Disclosure

Embodiments of the disclosure provide a method and device for effectively providing a service in a mobile communication system.

BEST MODE

Figure 1:
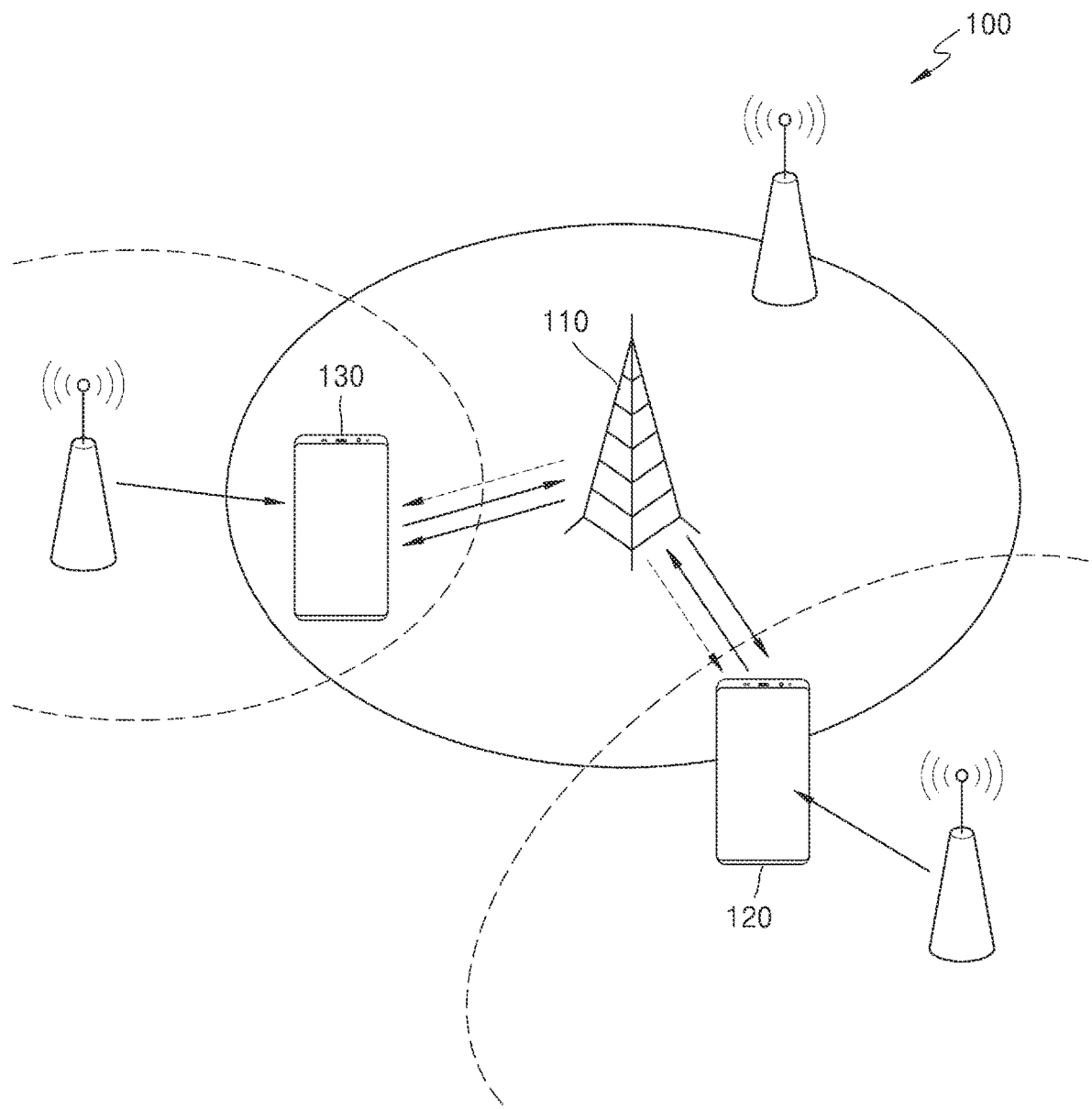
FIG. 1 illustrates a wireless communication system, according to an embodiment of the disclosure.

According to an embodiment of the disclosure, in a method of communication by a base station (BS) in a wireless communication system, the method may include: performing a channel access procedure in an unlicensed band; determining a processing time of a user equipment (UE), based on whether to apply a cyclic-extended signal; after completion of the channel access procedure, transmitting, via a downlink (DL) control channel, scheduling information about uplink (UL) transmission determined based on the processing time; and receiving, from the UE, a control channel or a data channel.

The processing time of the UE may include an additional processing time for generation of the cyclic-extended signal.

The additional processing time may be determined based on at least one of a subcarrier spacing and a gap between an initiation time of the UL transmission and an end time of transmission or reception of a channel before the initiation time.

The method may further include determining whether to apply the cyclic-extended signal to the UL transmission by the UE, and the determining of whether to apply the cyclic-extended signal may include determining to apply the cyclic-extended signal when the gap is equal to or greater than 16 μs, is equal to or greater than 25 μs, is equal to or greater than 16 μs+timing advance (TA), or is equal to or greater than 25 μs+TA.

The additional processing time may correspond to a length of one symbol.

DL control information transmitted via the DL control channel may include initiation symbol information of the UL transmission and configuration information of the cyclic-extended signal.

The configuration information of the cyclic-extended signal may further include at least one of information about whether to transmit the cyclic-extended signal in the UL transmission or length information of the cyclic-extended signal.

When a length value of the cyclic-extended signal is configured as 0 or the length value is not configured, the cyclic-extended signal may not be transmitted.

The configuration information of the cyclic-extended signal may include information for indicating whether to apply a processing time including an additional processing time for generation of the cyclic-extended signal or to apply a processing time not including the additional processing time for generation of the cyclic-extended signal.

According to an embodiment of the disclosure, in a method of communication by a user equipment (UE) in a wireless communication system, the method may include: receiving a downlink (DL) control channel; obtaining scheduling information about transmission of an uplink (UL) and cyclic-extended signal transmission configuration information, based on DL control information received via the DL control channel; and determining whether to transmit the scheduled UL, based on a reception time of the DL control channel, the cyclic-extended signal transmission configuration information, and the scheduling information.

According to an embodiment of the disclosure, in a base station (BS) of a wireless communication system, the BS may include: a transceiver; and a processor coupled with the transceiver and configured to perform a channel access procedure in an unlicensed band, determine a processing time of a user equipment (UE), based on whether to apply a cyclic-extended signal, after completion of the channel access procedure, transmit, via a downlink (DL) control channel, scheduling information about uplink (UL) transmission determined based on the processing time, and receive, from the UE, a control channel or a data channel.

The processing time of the UE may include an additional processing time for generation of the cyclic-extended signal, and the additional processing time may be determined based on at least one of a subcarrier spacing and a gap between an initiation time of the UL transmission and an end time of transmission or reception of a channel before the initiation time.

DL control information transmitted via the DL control channel may include initiation symbol information of the UL transmission and configuration information of the cyclic-extended signal.

The configuration information of the cyclic-extended signal may further include at least one of information about whether to transmit the cyclic-extended signal in the UL transmission or length information of the cyclic-extended signal.

According to an embodiment of the disclosure, in a user equipment (UE) of a wireless communication system, the UE may include: a transceiver; and a processor coupled with the transceiver and configured to receive a downlink (DL) control channel, obtain scheduling information about transmission of an uplink (UL) and cyclic-extended signal transmission configuration information, based on DL control information received via the DL control channel, and determine whether to transmit the scheduled UL, based on a reception time of the DL control channel, the cyclic-extended signal transmission configuration information, and the scheduling information.

MODE OF DISCLOSURE

Hereinafter, embodiments of the disclosure will be described in detail with reference to accompanying drawings. In the descriptions of the disclosure, detailed explanations of the related art are omitted when it is deemed that they may unnecessarily obscure the essence of the disclosure. The terms used in the specification are defined in consideration of functions used in the disclosure, and can be changed according to the intent or commonly used methods of users or operators. Accordingly, definitions of the terms are understood based on the entire descriptions of the present specification.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein. Rather, these embodiments are provided so that the disclosure will be thorough and complete and will fully convey the concept of the disclosure to one of ordinary skill in the art, and the disclosure will only be defined by the appended claims. Throughout the specification, like reference numerals refer to like elements.

Hereinafter, embodiments of the disclosure will be described in detail with reference to accompanying drawings.

In the following descriptions, well-known functions or configurations in the art, which are not directly associated with the disclosure, are not described. By omitting descriptions of unnecessary details, the concept of the disclosure can be clearly described.

For the same reasons, in the drawings, some elements may be exaggerated, omitted, or roughly illustrated. Also, size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein. Rather, these embodiments are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing device, such that the instructions, which are executed via the processor of the computer or other programmable data processing device, generate means for performing functions specified in the flowchart block or blocks. The computer program instructions may also be stored in a computer-executable or computer-readable memory that may direct the computer or other programmable data processing device to function in a particular manner, such that the instructions stored in the computer-executable or computer-readable memory may produce an article of manufacture including instruction means that perform the functions specified in the flowchart block or blocks. The computer program instructions may also be loaded onto the computer or other programmable data processing device to cause a series of operational steps to be performed on the computer or other programmable device to produce a computer implemented process such that the instructions that are executed on the computer or other programmable device provide operations for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~ unit" as used in the present embodiment refers to a software or hardware component, such as field-programmable gate array (FPGA) or application-specific integrated circuit (ASIC), which performs certain tasks. However, the term "~ unit" does not mean to be limited to software or hardware. A "~ unit" may be configured to be in an addressable storage medium or configured to operate one or more processors. Thus, a "~ unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "~ units" may be combined into fewer components and "~ units" or further separated into additional components and "~ units". Further, the components and "~ units" may be implemented to operate one or more central processing units (CPUs) in a device or a secure multimedia card. Also, a "~ unit" may include one or more processors in embodiments of the disclosure.

A support for various services is being considered with respect to a 5th generation (5G) system, compared to a legacy 4th generation (4G) communication system. For example, services of the 5G system may include services including enhanced Mobile BroadBand (eMBB), Ultra-Reliable and Low-Latency Communications (URLLC), massive Machine Type Communications (mMTC), and evolved multimedia broadcast/multicast Service (eMBMS). Also, the aforementioned services in the 5G system are exemplary, and services that are available in the 5G system are not limited to the examples. A service providing the URLLC service may be referred to as a URLLC system, and a service providing the eMBB service may be referred to as an eMBB system. Also, the term "service" and the term "system" may be interchangeably or mixedly used.

In such a communication system, a plurality of services may be provided to a user, and to provide the plurality of services to the user, there is a demand for a method and device for providing each of the services in a same time period according to features.

In a wireless communication system, e.g., long term evolution (LTE) or LTE-Advanced (LTE-A) systems or 5G new radio (NR)) system, a base station may transmit downlink control information (DCI) to a user equipment (UE) via a physical downlink control channel (PDCCH), the DCI including resource allocation information for transmission of a downlink (DL) signal. The UE may be configured to receive at least one DL signal of the DCI (e.g., a channel-state information reference signal (CSI-RS)), a physical broadcast channel (PBCH), or a physical downlink shared channel (PDSCH).

For example, the base station may transmit, in a slot n, DCI indicating the UE to receive the PDSCH in the slot n via the PDCCH, and upon reception of the DCI, the UE may receive the PDSCH in the slot n, based on the received DCI.

Also, in the LTE, LTE-A, or NR system, the base station and the UE may be configured such that the base station transmits DCI including uplink (UL) resource allocation information to the UE via the PDCCH, and thus the UE transmits at least one UL signal of UL control information (UCI) (e.g., a sounding reference signal (SRS), UCI, or a physical random access channel (PRACH)) or a physical uplink shared channel (PUSCH) to the base station.

For example, the UE may receive, from the base station via the PDCCH, UL transmission configuration information (or DCI including resource allocation information for UL transmission or UL grant) in a slot n, and may perform UL data channel transmission (hereinafter, PUSCH transmission), according to a predefined time (e.g., n+4), a time configured by an upper signal (e.g., n+k), or UL signal transmission time indicator information included in the UL transmission configuration information.

In a case where configured DL transmission is transmitted from the base station to the UE via an unlicensed band, or configured UL transmission is transmitted from the UE to the base station via the unlicensed band, a communication device (the base station or the UE) may perform, before or immediately before an initiation of configured signal transmission, a channel access procedure or listen-before talk (LBT) on the unlicensed band where signal transmission is configured, and according to a result of performing the channel access procedure, when it is determined that the unlicensed band is in an idle state, the communication device may access the unlicensed band and then may perform the configured signal transmission. According to the result of the channel access procedure performed by the communication device, when it is determined that the unlicensed band is not in the idle state or is determined that the unlicensed band is in an occupied state, the communication device is not able to access the unlicensed band and thus may not be able to perform the configured signal transmission.

Hereinafter, in various embodiments of the disclosure, a channel access procedure may include a procedure such as LBT in which a UE or a base station checks whether a channel of an unlicensed band is in an idle state or is occupied. In the channel access procedure with respect to the unlicensed band where signal transmission is configured, the communication device may determine the idle state of the unlicensed band by receiving a signal in the unlicensed band during a predefined time or a time calculated according to a predefined rule (e.g., a time calculated using a random value selected by the base station or the UE), and then by comparing a strength of the received signal with a threshold value that is predefined or calculated by using a function of at least one parameter including a channel bandwidth, a bandwidth of a signal to be transferred, intensity of transmit power, a beamwidth of a transmission signal, or the like.

For example, when a strength of a signal received by the transmission device during 25 μs is less than −72 dBm that is a predefined threshold, the communication device may determine that the unlicensed band is in the idle state and thus may perform the configured signal transmission in the unlicensed band. In this regard, a maximum available time of the signal transmission may be limited according to a maximum channel occupancy time in the unlicensed band defined according to each country or each region, or a type (e.g., the base station or the UE, or a master device or a slave device) of the communication device. For example, in Japan, the base station or the UE in 5 GHz of the unlicensed band may perform the channel access procedure and then may transmit, during maximum 4 ms, a signal by occupying a channel without additionally performing the channel access procedure. When the strength of the signal received by the transmission device during 25 μs is greater than −72 dBm that is the predefined threshold, the communication device may determine that the unlicensed band is not in the idle state and may not transmit a signal.

For the 5G communication system, various technologies may be introduced for providing various services and supporting a high data transmission rate, the various technologies including re-transmission in a code block group (CBG) unit, transmission of an UL signal without UL scheduling information (e.g., grant-free UL transmission), or the like. Therefore, to perform 5G communication via the unlicensed band, a more efficient channel access procedure based on various parameters is required.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), and LTE-Advanced (LTE-A) of the 3rd Generation Partnership Project (3GPP), high rate packet data (HRPD) and ultra mobile broadband (UMB) of 3GPP2, 802.16e of the Institute of Electrical and Electronic Engineers (IEEE), or the like. As a 5G wireless communication system, 5G or NR wireless communication systems are being established.

In a wireless communication system including 5G, at least one of services including eMBB, mMTC, and URLLC may be provided to a UE. The services may be provided to a same UE during a same time period. In embodiments, the eMBB service may be for high-speed transmission of high-volume data, the mMTC service may be for minimization of power of the terminal and accesses by multiple terminals, and the URLLC service may be for high reliability and low latency, but the disclosure is not limited thereto. The three services may be primary services in a wireless communication system such as an LTE system or a 5G or new radio/next radio (NR) system after the LTE system, but the disclosure is not limited to the examples.

Hereinafter, a base station is an entity that allocates resources to a UE, and may be at least one of an evolved node B (eNode B or eNB), a Node B, a base station (BS), a radio access unit, a BS controller, or a node on a network. Examples of a terminal may include a UE, a mobile station (MS), a cellular phone, a smartphone, a computer, a multimedia system capable of performing a communication function, or the like In the disclosure, a downlink (DL) is a radio transmission path of a signal transmitted from a BS to a UE, and an uplink (UL) is a radio transmission path of a signal transmitted from a UE to a BS. Hereinafter, embodiments of the disclosure will now be described using a LTE system or a LTE-A system as an example, and in order to describe a method and device proposed in the disclosure, the terms "physical channel" and "signal" in legacy LTE or LTE-A system may be used. Embodiments of the disclosure may be applied to other communication systems having similar technical backgrounds or channel type as a mobile communication system described in the disclosure. For example, the 5G mobile communication technology (5G, new radio, NR) developed after the LTE-A system may be included therein. The disclosure is applicable to other communication systems through modification at the discretion of one of ordinary skill in the art without greatly departing from the scope of the disclosure.

As a representative example of a broadband wireless communication system, the NR system has adopted an orthogonal frequency division multiplexing (OFDM) scheme in a DL and has adopted OFDM and a single carrier frequency division multiple access (SC-FDMA) scheme in an UL. A multiple access scheme may identify data and control information for each user by allocating and operating time-frequency resources on which the data or the control information is to be carried for each user, so that the time-frequency resources do not overlap each other, that is, so that orthogonality is established.

The NR system has adopted a hybrid automatic repeat request (HARQ) scheme of retransmitting data at a physical layer when a decoding failure occurs in initial transmission. The HARQ scheme indicates that, when a receiver fails to correctly decode data, the receiver transmits decoding failure indication information (e.g., negative acknowledgement (NACK)) to a transmitter so as to allow the transmitter to retransmit the data at its physical layer. The receiver may combine the data, which is retransmitted by the transmitter, with data previously failed in decoding, thereby increasing data reception performance. Also, according to the HARQ scheme, when the receiver correctly decodes the data, the receiver transmits decoding success indication information (e.g., acknowledgement (ACK)) to the transmitter so as to allow the transmitter to transmit new data.

Hereinafter, the disclosure relates to a wireless communication system, and more particularly, to a method and device for deciding a response signal transmission time of a UE in a wireless communication system. In a wireless communication system, in particular, in an NR system, a BS may determine a time for a UE to transmit a response signal HARQ-ACK in response to DL data the UE received from the BS, and may indicate the time to the UE. When the BS indicates a response signal transmission time of the UE, the BS may not indicate the UE to transmit a response signal earlier than an earliest time at which the UE can transmit the response signal to received DL data. Therefore, there is a need for a method of calculating a minimum processing time for the UE to prepare transmission of the response signal. The disclosure provides a method and device for deciding a minimum processing, such that the BS and the UE can seamlessly perform communication.

The method and device according various embodiments of the disclosure may involve deciding a response signal transmission time of the UE according to a channel access initiation time or a control channel transmission time in an unlicensed band, such that the BS and the UE may further effectively perform communication. Effects that are obtainable from the disclosure are not limited to the aforementioned effects, and other unstated effects will be clearly understood by one of ordinary skill in the art, based descriptions below.

Hereinafter, terms indicating signals, terms indicating channels, terms indicating control information, terms indicating network entities, terms indicating elements of devicesu9, and the like, as used in the following description, are exemplified for convenience of descriptions. Accordingly, the disclosure is not limited to terms to be described below, and other terms having equal technical meanings may be used.

Also, in the disclosure, various embodiments will now be described by using terms and names defined in some communication standards (e.g., the 3GPP), but the disclosure is not limited to the terms and names. Various embodiments of the disclosure may be easily modified and applied to other communication systems.

FIG. 1 illustrates a wireless communication system, according to an embodiment of the disclosure. FIG. 1 illustrates a BS 110, a terminal 120, and a terminal 130, as parts of nodes using wireless channels in the wireless communication system. While FIG. 1 illustrates only one BS, another BS same as or similar to the BS 100 may be further present.

The BS 110 refers to a network infrastructure providing a radio access to the terminals 120 and 130. The BS 110 has coverage defined as a preset geographical region based on a range for transmitting a signal. The BS 110 may also be referred to as an access point (AP), eNodeB (eNB), gNodeB (gNB), 5G node, wireless point, transmission/reception point (TRP), or another term having same technical meaning.

The terminal 120 and the terminal 130 may respectively refer to devices used by users and may perform communication with the BS 110 via the wireless channels. Also, according to an embodiment, at least one of the terminal 120 and the terminal 130 may be operated without user-involvement. That is, at least one of the terminal 120 and the terminal 130 may be a device performing MTC and may not be carried by a user. According to an embodiment, each of the terminal 120 and the terminal 130 may be referred to as a UE, a mobile station, a subscriber station, a remote terminal, a wireless terminal, a user device, or another term having same technical meaning.

A wireless communication environment 100 may include wireless communication in an unlicensed band. The BS 110, the terminal 120, and the terminal 130 may transmit and receive a wireless signal in the unlicensed band (e.g., 5 to 7.125 GHz and/or 64 to 71 GHz). In the unlicensed band, a cellular communication system and another communication system (e.g., a wireless local area network (WLAN)) may coexist. To ensure fairness between two communication systems, in other words, to prevent occurrence of a situation where a channel is exclusively used by one system, the BS 110, the terminal 120, and the terminal 130 may perform a channel access procedure for an unlicensed band. As an example of the channel access procedure for an unlicensed band, the BS 110, the terminal 120, and the terminal 130 may perform a "listen before talk (LBT)" procedure.

The BS 110, the terminal 120, and the terminal 130 may transmit and receive a wireless signal in a millimeter-wave (mmWave) band (e.g., 28 GHz, 30 GHz, 38 GHz, and/or 60 GHz band). In this regard, in order to increase a channel gain, the BS 110, the terminal 120, and the terminal 130 may perform beamforming Here, the beamforming may include transmission beamforming and reception beamforming That is, the BS 110, the terminal 120, and the terminal 130 may apply directivity to a transmission signal or a reception signal. To this end, the BS 110 and the terminals 120 and 130 may select serving beams via a beam search procedure or a beam management procedure. After the serving beams are selected, communication thereafter may be performed using a resource in a quasi co-located (QCL) relation with a resource that transmitted the serving beams.

Figure 2:
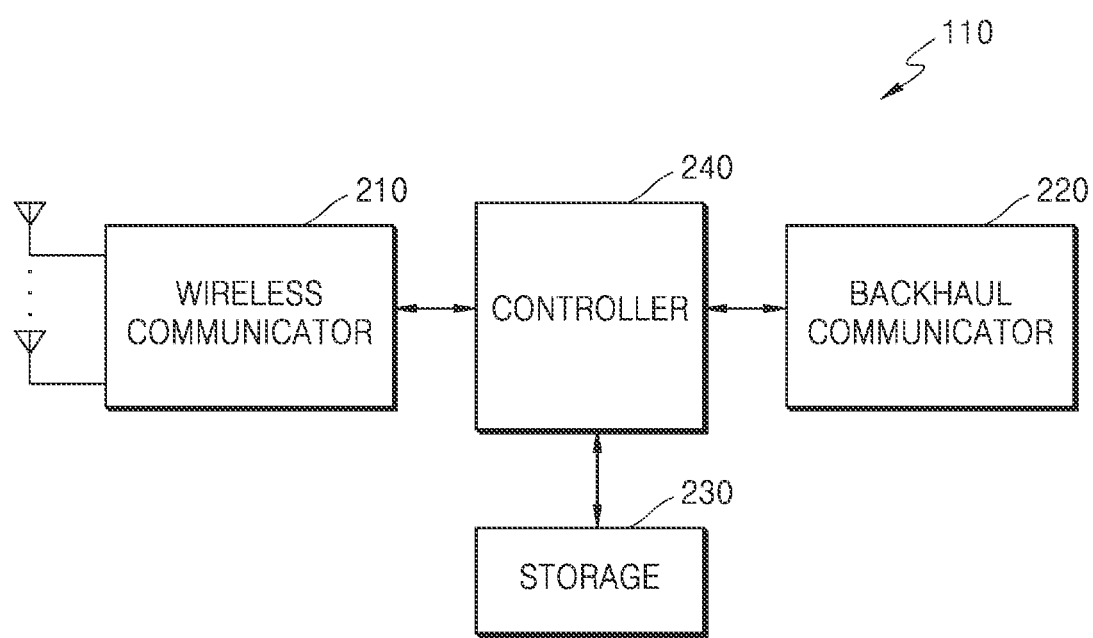
FIG. 2 illustrates a configuration of a base station (BS) in a wireless communication system, according to an embodiment of the disclosure.

FIG. 2 illustrates a configuration of a BS in a wireless communication system, according to an embodiment of the disclosure. The configuration illustrated in FIG. 2 may be understood as a configuration of the BS 110. However, the BS 110 is not limited to the example, and thus, may include more elements or fewer elements than the elements illustrated in FIG. 2. The terms such as "unit", "module", and the like used in the disclosure indicate a unit, which processes at least one function or motion, and the unit and the module may be implemented by hardware or software, or by a combination of hardware and software.

Referring to FIG. 2, the BS may include a wireless communicator 210, a backhaul communicator 220, a storage 230, and a controller 240.

The wireless communicator 210 may perform functions for transmitting or receiving a signal via a wireless channel. For example, the wireless communicator 210 may perform conversion between a baseband signal and a bit string based on physical layer specifications of a system. For example, for data transmission, the wireless communicator 210 may generate complex symbols by encoding and modulating a transmission bit string. For data reception, the wireless communicator 210 may reconstruct a reception bit string by demodulating and decoding a baseband signal.

Also, the wireless communicator 210 may up-convert a baseband signal into a radio frequency (RF) band signal and then may transmit the RF band signal via an antenna, and may down-convert an RF band signal received via the antenna, into a baseband signal. To do so, the wireless communicator 210 may include a transmission filter, a reception filter, an amplifier, a mixer, an oscillator, a digital-to-analog convertor (DAC), an analog-to-digital convertor (ADC), or the like. However, the disclosure is not limited thereto. Also, the wireless communicator 210 may include a plurality of transmission and reception paths. Furthermore, the wireless communicator 210 may include at least one antenna array including a plurality of antenna elements. However, the disclosure is not limited thereto.

In terms of hardware, the wireless communicator 210 may be configured as a digital unit and an analog unit, and the analog unit may be configured as a plurality of sub-units depending on operating power, an operating frequency, or the like. The digital unit may be configured as at least one processor (e.g., a digital signal processor (DSP)). However, the disclosure is not limited thereto.

The wireless communicator 210 may transmit and receive signals as described above. Accordingly, all parts or some parts of the wireless communicator 210 may be called a transmitter, a receiver, or a transceiver. Also, in the descriptions below, transmission and reception performed via a wireless channel indicate that the aforementioned processing performed by the wireless communicator 210 is applied thereto. According to an embodiment, the wireless communicator 210 may include at least one transceiver.

According to an embodiment, the backhaul communicator 220 provides an interface for performing communication with other nodes in a network. That is, the backhaul communicator 220 converts a bit string to a physical signal, the bit string being transmitted from the BS to another node, e.g., another access node, another BS, an upper node, a core network, and the like, and converts a physical signal to a bit string, the physical signal being received from another node. According to an embodiment, the backhaul communicator 220 may be included in the wireless communicator 210, or the wireless communicator 210 may perform a function of the backhaul communicator 220. However, the disclosure is not limited thereto.

The storage 230 stores basic programs, application programs, and data, e.g., configuration information, for operations of the BS. The storage 230 may be configured as a volatile memory, a non-volatile memory, or a combination of a volatile memory and a non-volatile memory. Furthermore, the storage 230 provides stored data, in response to a request by the controller 240. According to an embodiment, the storage 230 may include a memory. Also, according to an embodiment, the storage 230 may be configured as a storage medium such as a read-only memory (ROM), a random access memory (RAM), a hard disc, a compact disc-ROM (CD-ROM), a digital versatile disc (DVD), and the like or a combination of storage media. Also, the storage 230 may store a program for performing embodiments described in the disclosure.

The controller 240 may control overall operations of the BS. For example, the controller 240 may transmit and receive signals via the wireless communicator 210 or the backhaul communicator 220. Also, the controller 240 records data to or reads data from the storage 230. The controller 240 may perform functions of a protocol stack which are requested by the communication rules. According to an embodiment, the protocol stack may be included in the wireless communicator 210. According to an embodiment, the controller 240 may include at least one processor. Also, at least one configuration of the BS may be implemented as one chip.

According to various embodiments, the controller 240 may control the BS to perform operations according to various embodiments to be described below. For example, the controller 240 may perform a channel access procedure on an unlicensed band. For example, the transceiver (e.g., the wireless communicator 210) may receive signals transmitted via the unlicensed band, and the controller 240 may determine whether the unlicensed band is in an idle state, by comparing strength of the received signal with a threshold value that is predefined or is determined as a value according to a function where a bandwidth is a factor. Also, for example, the controller 240 may transmit a control signal to a UE or receive a control signal from the UE, via the transceiver. Also, the controller 240 may transmit data to the UE or receive data from the UE, via the transceiver. Based on the control signal or data signal received from the UE, the controller 240 may determine a transmission result with respect to a signal transmitted to the UE. Also, for example, based on the transmission result, i.e., a reception result with respect to the control signal or data signal received by the UE, the controller 240 may maintain or change a value of a contention window (hereinafter, referred to as the contention window adjustment) for the channel access procedure. Also, for example, according to various embodiments, based on an earliest time at which the UE can transmit a reception result or a response signal (HARQ-ACK) with respect to a DL data channel, based on at least one channel transmission time from among a control channel transmission time and a data channel transmission time, or based on a processing time minimally required for the UE to transmit the response signal, the controller 240 may determine the response signal transmission time of the UE.

Figure 3:
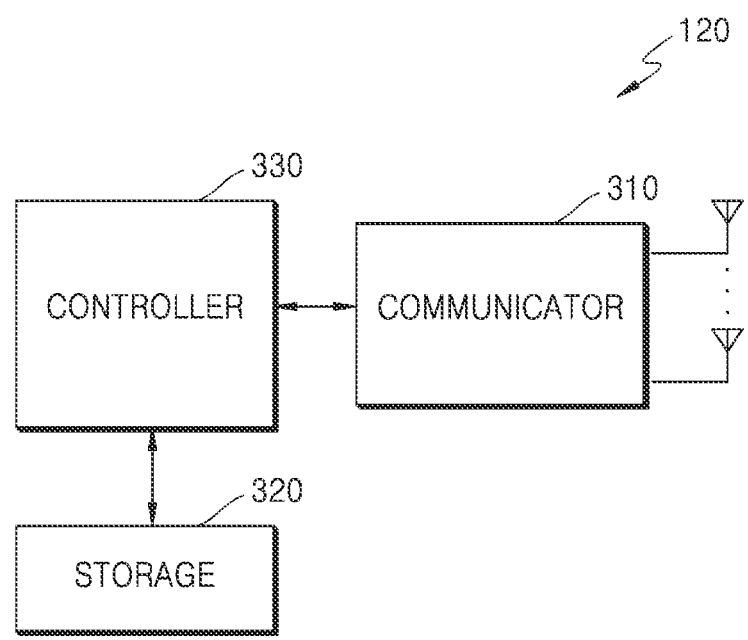
FIG. 3 illustrates a configuration of a user equipment (UE) in a wireless communication system, according to an embodiment of the disclosure.

FIG. 3 illustrates a configuration of a UE in a wireless communication system, according to an embodiment of the disclosure. The configuration illustrated in FIG. 3 may be understood as a configuration of the UE 120. However, the UE 120 is not limited to the example, and thus, may include more elements or fewer elements than the elements illustrated in FIG. 3. The terms such as "unit", "module", and the like used in the disclosure indicate a unit, which processes at least one function or motion, and the unit and the module may be implemented by hardware or software, or by a combination of hardware and software.

Referring to FIG. 3, the UE may include a communicator 310, a storage 320, and a controller 330.

The communicator 310 may perform functions for transmitting and receiving signals via a wireless channel. For example, the communicator 310 may perform conversion between a baseband signal and a bit string based on physical layer specifications of a system. For example, for data transmission, the communicator 310 generates complex symbols by encoding and modulating a transmission bit string. For data reception, the communicator 310 may reconstruct a reception bit string by demodulating and decoding a baseband signal. The communicator 310 may up-convert a baseband signal into an RF band signal and then may transmit the RF band signal via an antenna, and may down-convert an RF band signal received via the antenna, into a baseband signal. For example, the communicator 310 may include a transmission filter, a reception filter, an amplifier, a mixer, an oscillator, a DAC, an ADC, or the like.

Also, the communicator 310 may include a plurality of transmission and reception paths. Furthermore, the communicator 310 may include at least one antenna array including a plurality of antenna elements. In terms of hardware, the communicator 310 may be configured as a digital circuit and an analog circuit (e.g., a radio frequency integrated circuit (RFIC)). In this regard, the digital circuit and the analog circuit may be implemented as one package. Also, the communicator 310 may include a plurality of RF chains. However, the disclosure is not limited thereto. Furthermore, the communicator 310 may perform beamforming.

The communicator 310 may transmit and receive signals as described above. Accordingly, all parts or some parts of the communicator 310 may be called a 'transmitter', a 'receiver', or a 'transceiver'. Also, in the descriptions below, transmission and reception performed via a wireless channel indicate that the aforementioned processing performed by the communicator 310 is applied thereto. According to an embodiment, the communicator 310 may include at least one transceiver.

The storage 320 stores basic programs, application programs, and data, e.g., configuration information, for operations of the UE. The storage 320 may be configured as a volatile memory, a non-volatile memory, or a combination of a volatile memory and a non-volatile memory. Furthermore, the storage 320 provides stored data, in response to a request by the controller 330. According to an embodiment, the storage 320 may include a memory. Also, according to an embodiment, the storage 320 may be configured as a storage medium such as a ROM, a RAM, a hard disc, a CD-ROM, a DVD, and the like or a combination of storage media. Also, the storage 320 may store a program for performing embodiments described in the disclosure.

The controller 330 controls overall operations of the UE. For example, the controller 330 transmits and receives signals via the communicator 310. Also, the controller 330 records data to or reads data from the storage 320. The controller 330 may perform functions of a protocol stack which are requested by the communication rules. To do so, the controller 330 may include at least one processor or microprocessor or may be a part of a processor. According to an embodiment, the controller 330 may include at least one processor. Also, according to an embodiment, a part of the communicator 310 and/or the controller 330 may be called a communication processor (CP). Also, at least one configuration of the UE may be implemented as one chip.

According to various embodiments, the controller 330 may control the UE to perform operations according to various embodiments to be described below. For example, the controller 330 may receive, via the transceiver (e.g., the communicator 310), a DL signal (a DL control signal or DL data) transmitted from a BS. Also, for example, the controller 330 may determine a transmission result with respect to the DL signal. The transmission result may include information of a feedback with respect to ACK, NACK, discontinuous transmission (DTX), etc. of the transmit DL signal. In the disclosure, the transmission result may be referred to various terms including a reception state of a DL signal, a reception result of the DL signal, a decoding result of the DL signal, HARQ-ACK information of the DL signal, or the like. Also, for example, the controller 330 may transmit, to the BS, a UL signal as a response signal to the DL signal via the transceiver. The UL signal may explicitly or implicitly include the transmission result of the DL signal. Also, for example, when a response signal transmission time with respect to the DL signal, which is configured or a indicated by the BS, is earlier than a minimum processing time required for the UE to transmit a transmission result (or a response signal), the controller 330 may not transmit the transmission result or may transmit NACK.

Also, according to an embodiment, the controller 330 may perform a channel access procedure on an unlicensed band. For example, the transceiver (e.g., the communicator 310) may receive signals transmitted via the unlicensed band, and the controller 330 may determine whether the unlicensed band is in an idle state, by comparing strength of the received signal with a threshold value that is predefined or is determined as a value according to a function where a bandwidth is a factor. The controller 330 may perform an access procedure on the unlicensed band so as to transmit a signal to the BS.

Figure 4:
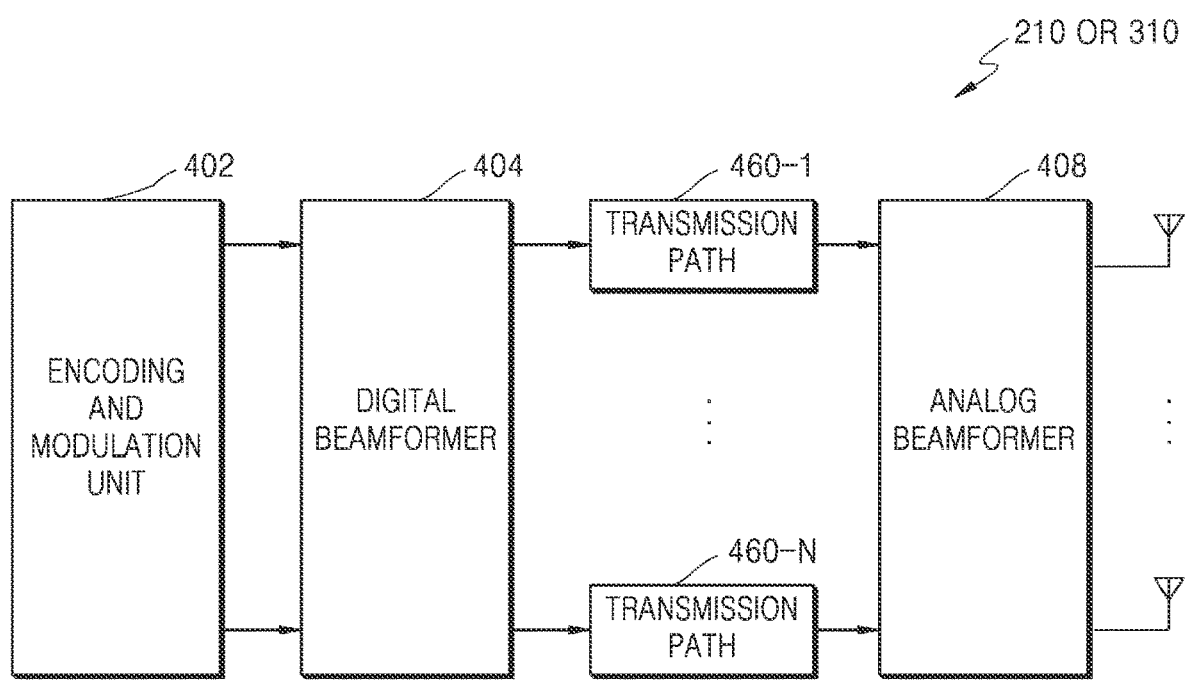
FIG. 4 illustrates a configuration of a communicator in a wireless communication system, according to an embodiment of the disclosure.

FIG. 4 illustrates a configuration of a communicator in a wireless communication system, according to an embodiment of the disclosure. FIG. 4 illustrates an example of a detailed configuration of the wireless communicator 210 of FIG. 2 or the communicator 310 of FIG. 3. In detail, as part of the wireless communicator 210 of FIG. 2 or the communicator 310 of FIG. 3, FIG. 4 illustrates an example of elements for performing beamforming. However, the disclosure is not limited thereto.

Referring to FIG. 4, the wireless communicator 210 or the communicator 310 includes an encoding and modulation unit 402, a digital beamformer 404, a plurality of transmission paths 406-1 to 406-N, and an analog beamformer 408.

The encoding and modulation unit 402 may perform channel encoding. For the channel encoding, at least one of low density parity check (LDPC) codes, convolution codes, or polar codes may be used. However, the disclosure is not limited thereto. Also, the encoding and modulation unit 402 may generate modulated symbols by performing constellation mapping.

The digital beamformer 404 may perform beamforming on a digital signal (e.g., the modulated symbols). To do so, the digital beamformer 404 may multiply the modulated symbols by beamforming weights. In this regard, the beamforming weights are used to change the magnitude and phase of a signal, and may be referred to as a precoding matrix, a precoder, and the like. However, the disclosure is not limited thereto. The digital beamformer 404 may output modulated symbols that are digitally-beamformed by the plurality of transmission paths 406-1 to 406-N. Here, according to a multiple input multiple output (MIMO) transmission technique, the modulated symbols may be multiplexed or same modulated symbols may be provided to the plurality of transmission paths 406-1 to 406-N.

The plurality of transmission paths 406-1 to 406-N may convert digitally-beamformed digital signals to analog signals. To do so, each of the plurality of transmission paths 406-1 to 406-N may include an inverse fast Fourier transform (IFFT) operator, a cyclic prefix (CP) inserter, a DAC, and an up-converter. The CP inserter is arranged for an OFDM scheme, and may be excluded when a different physical layer scheme (e.g., filter bank multi-carrier (FBMC)) is applied. That is, the plurality of transmission paths 406-1 to 406-N may provide independent signal processing processes to a plurality of streams generated through digital beamforming. However, depending on implementation methods, some elements of the plurality of transmission paths 406-1 to 406-N may be commonly used.

The analog beamformer 408 performs beamforming on an analog signal. To do so, the analog beamformer 408 multiplies the analog signals by beamforming weights. In this regard, the beamforming weights are used to change the magnitude and phase of a signal. In detail, the analog beamformer 408 may be variously configured, based on connection structures between the plurality of transmission paths 406-1 to 406-N and antennas. For example, each of the plurality of transmission paths 406-1 to 406-N may be connected to one antenna array. Also, according to an embodiment, the plurality of transmission paths 406-1 to 406-N may be connected to one antenna array. Also, according to an embodiment, the plurality of transmission paths 406-1 to 406-N may be adaptively connected to one antenna array or at least two antenna arrays.

Figure 5:
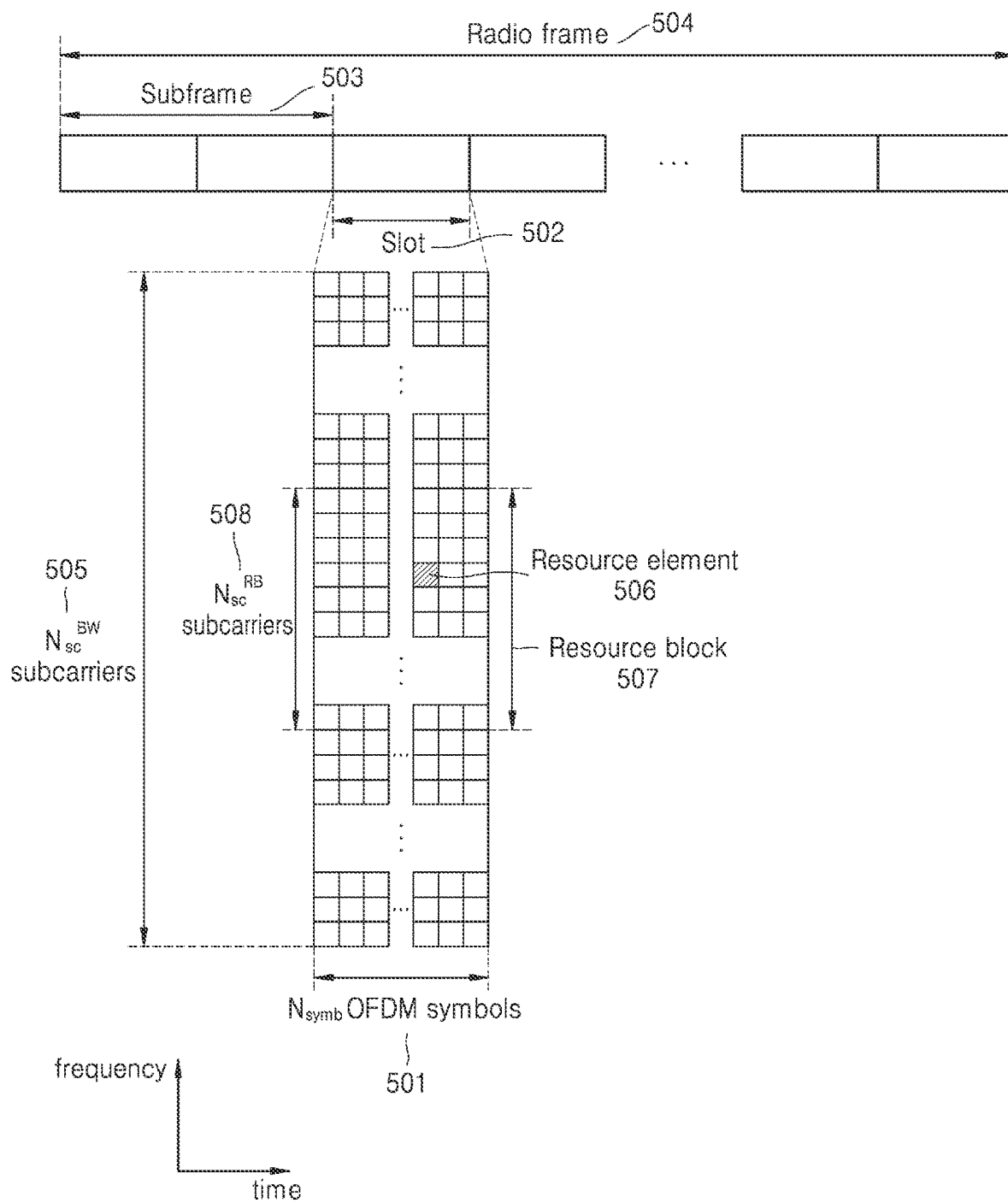
FIG. 5 illustrates a radio resource domain in a wireless communication system, according to an embodiment of the disclosure.

FIG. 5 illustrates a radio resource domain in a wireless communication system, according to an embodiment of the disclosure. According to an embodiment, the radio resource domain may include a time-frequency domain structure. According to an embodiment, the wireless communication system may include an NR communication system.

Referring to FIG. 5, in the radio resource domain, a horizontal axis thereof represents a time domain and a vertical axis thereof represents a frequency domain. A minimum transmission unit in the time domain may be an OFDM and/or DFT-s-OFDM symbol, and Nsymb OFDM and/or DFT-s-OFDM symbols 501 may constitute a slot 502. In various embodiments, the OFDM symbol may include a symbol for a case of transmitting or receiving a signal by using an OFDM multiplexing scheme, and the DFT-s-OFDM symbol may include a symbol for a case of transmitting or receiving a signal by using a SC-FDMA multiplexing scheme. Hereinafter, for convenience of descriptions of the disclosure, an embodiment of the OFDM symbol will now be described but the embodiment is also applicable to an embodiment of the DFT-s-OFDM symbol. Furthermore, for convenience of descriptions of the disclosure, an embodiment for DL signal transmission or reception will now be described but the embodiment is also applicable to an embodiment of UL signal transmission or reception.

When the subcarrier spacing is 15 kHz, unlike what is shown in FIG. 5, the one slot 502 may constitute a subframe 503, and lengths of the slot 502 and the subframe 503 may each be 1 ms. According to an embodiment, the number of slots constituting the one subframe 503 and the length of the slot 502 may be different depending on the subcarrier spacing. For example, when the subcarrier spacing is 30 kHz, two slots may constitute the one subframe 503 as illustrated in FIG. 5. In this case, the length of the slot 502 may be 0.5 ms, and the length of the subframe 503 may be 1 ms. A radio frame 504 may be a time domain period consisting of 10 subframes. A minimum transmission unit in the frequency domain is a subcarrier, and carrier bandwidths that constitute a resource grid may consist of a total of NscBW subcarriers 505.

However, the subcarrier spacing, the number of slots 502 included in the subframe 503, the length of the slot 502, and the length of the subframe 503 may be variably applied. For example, in the LTE system, the subcarrier spacing is 15 kHz and two slots constitute the one subframe 503, in which case the length of the slot 502 may be 0.5 ms and the length of the subframe 503 may be 1 ms. According to an embodiment, in the NR system, a subcarrier spacing (μ) may be one of 15 kHz, 30 kHz, 60 kHz, 120 kHz, and 240 kHz, and the number of slots included in one subframe may be 1, 2, 4, 8, or 16 according to the subcarrier spacing (μ).

In the time-frequency domain, a default resource unit may be a resource element (RE) 506, and the RE 506 may be represented with an OFDM symbol index and a subcarrier index. A resource block (RB) may include a plurality of REs. In the LTE system, a RB (or a physical resource block (PRB)) may be defined by Nsymb consecutive OFDM symbols in the time domain and NSCRB consecutive subcarriers in the frequency domain. The number of symbols included in one RB may be Nsymb=14, and the number of subcarriers may be NSCRB=12, or the number of symbols included in one RB may be Nsymb=7 and the number of subcarriers may be NSCRB=12. The number of RBs (NRB) may vary according to a bandwidth of a system transmission band. In the NR system, a RB 507 may be defined by NSCRB consecutive subcarriers in the frequency domain. The number of subcarriers may be NSCRB=12. The frequency domain may include common resource blocks (CRBs). A PRB may be defined in a bandwidth part (BWP) in the frequency domain. Different CRB and PRB numbers may be determined according to the subcarrier spacing.

DL control information may be transmitted in first N OFDM symbol(s) in a slot. In general, N may be N={1, 2, 3}, and a UE may be configured with the number of symbols in which DL control information may be transmitted from a BS via higher layer signaling. Furthermore, based on the amount of control information to be transmitted in a current slot, the BS may change the number of symbols in which the DL control information may be transmitted for each slot, and may transmit information about the number of symbols to the UE via a separate DL control channel.

In the NR and/or LTE system, scheduling information for DL data or UL data may be transmitted via DCI from the BS to the UE. According to an embodiment, the DCI may be defined in various formats, each format being changed according to whether the DCI includes scheduling information for UL data (UL grant) or scheduling information for DL data (DL grant), whether the DCI corresponds to compact DCI with a small size of control information or fallback DCI, whether spatial multiplexing with multiple antennas is applied, and/or whether the DCI corresponds to DCI for power control. For example, a DCI format (e.g., DCI format 1_0 of NR) corresponding to scheduling control information (DL grant) for DL data may include at least one of the following pieces of control information. NR DCI format 1_0 may include scheduling for DL data.

DCI format identifier: an identifier for identifying a format of the DCI frequency domain resource allocation: indicates an RB allocated for data transmission time domain resource allocation: indicates slots and symbols allocated for data transmission VRB-to-PRB mapping: indicates whether to apply a virtual resource block (VRB) mapping scheme Modulation and coding scheme (MCS): indicates a size of a transport block (TB) that is data to be transmitted and modulation scheme used for data transmission New data indicator (NDI): indicates whether it is HARQ initial transmission or retransmission Redundancy version (RV): indicates a redundancy version of HARQ HARQ process number: indicates a process number of HARQ Physical downlink shared channel (PDSCH) assignment index (or downlink assignment index): indicates the number of PDSCH reception results to be reported from the UE to the BS (e.g., the number of HARQ-ACKs)

Transmit Power Control (TPC) command for physical uplink control channel (PUCCH): indicates a transmit power control command for an uplink control channel (PUCCH)

PUCCH resource indicator: indicates a PUCCH resource used in reporting HARQ-ACK that includes a reception result of a PDSCH configured via the DCI PUCCH transmit timing indicator (or PDSCH-to-HARQ_feedback timing indicator): indicates information about a slot or a symbol in which a PUCCH for reporting HARQ-ACK including a reception result of a PDSCH configured via the DCI is to be transmitted The DCI may be transmitted on a physical downlink control channel (PDCCH) (hereinafter, interchangeably used with control information) or an enhanced PDCCH (EPDCCH) (hereinafter, interchangeably used with enhanced control information) after channel coding and modulation processes. Hereinafter, transmission or reception on a PDCCH or EPDCCH may be understood as DCI transmission or reception on the PDCCH or EPDCCH, and transmission or reception on a PDSCH may be understood as DL data transmission or reception on the PDSCH.

According to an embodiment, a cyclic redundancy check (CRC) scrambled by a particular radio network temporary identifier (RNTI) or a cell RNTI (C-RNTI) that is independent for each UE, may be added to the DCI, and the DCI for each UE may be channel coded and then may be configured into an independent PDCCH and transmitted. In the time domain, the PDCCH may be transmitted during a control channel transmission period. In the frequency domain, a mapping position of the PDCCH may be determined by at least an identifier (ID) of each UE, and may be transmitted in the entire system transmission band or some bands of the system transmission band.

According to an embodiment, DL data may be transmitted on a PDSCH that is a physical channel for DL data transmission. The PDSCH may be transmitted after a control channel transmission period, and in the frequency domain, scheduling information such as a mapping position of the PDSCH and a modulation scheme for the PDSCH may be determined based on DCI transmitted via a PDCCH.

According to an embodiment, based on MCS information among the control information configuring the DCI, the BS may notify the UE of a modulation scheme applied to the PDSCH to be transmitted and the size of data to be transmitted (transport block size (TBS)). In various embodiments, an MCS may be configured of 5 bits or greater than or less than 5 bits. The TBS corresponds to the size of a TB before channel coding for error correction is applied to the data (TB) to be transmitted by the BS.

According to an embodiment, in the NR system, a modulation scheme supported for DL data transmission may include at least one of quadrature phase shift keying (QPSK), 16 quadrature amplitude modulation (16QAM), 64QAM, or 256QAM, and each modulation order Qm may be 2, 4, 6, or 8. That is, 2 bits per symbol may be transmitted for QPSK modulation, 4 bits per symbol may be transmitted for 16QAM modulation, 6 bits per symbol may be transmitted for 64QAM modulation, and 8 bits per symbol may be transmitted for 256QAM modulation. Furthermore, a modulation scheme above 256QAM may be used according to a system modification. However, the disclosure is not limited thereto.

According to an embodiment, in the NR system, a UL and DL HARQ scheme may include an asynchronous HARQ scheme in which a point of time for data retransmission is not fixed. For example, for DL, when the BS receives HARQ NACK as feedback on initial transmission data from the UE, the BS may arbitrarily determine a point of transmission time for data to be retransmitted, according to a scheduling operation. The UE may perform buffering on data determined as an error according to a result of decoding on reception data for a HARQ operation, and then may combine the buffered data with data retransmitted from the BS. HARQ ACK/NACK information of a PDSCH transmitted in a slot n-k may be transmitted in a slot n via a PUCCH or a PUSCH from the UE to the BS.

According to an embodiment, in the 5G communication system such as NR, a k value may be included in DCI for indicating or scheduling reception of the PDSCH transmitted in the slot n-k and may be transmitted, or may be configured to the UE via higher layer signaling. The BS may configure at least one k value to the UE via higher layer signaling, or may indicate a particular k value to the UE through DCI. k may be determined according to a HARQ-ACK processing capability of the UE, in other words, according to a minimum time required for the UE to receive the PDSCH and to generate and report HARQ-ACK with respect to the PDSCH. Also, before the UE is configured with a k value, the UE may use a predefined value or a default value as a k value.

Various embodiments of the disclosure will now be described based on the NR system, but the disclosure is applicable not only to the NR system but also applicable to various communication systems including LTE, LTE-A, LTE-A-Pro systems, 5G, or the like. While the disclosure relates to a system and device for transmitting and receiving signals by using an unlicensed band, embodiments of the disclosure may be applicable to a system that operates in a licensed band.

Hereinafter, in the disclosure, higher layer signaling or an upper signal may refer to a method of transferring a signal transferred to a UE from a BS using a DL data channel of a physical layer or a signal transferred to the BS from the UE using an UL data channel of a physical layer, and may include at least one of radio resource control (RRC) signaling, packet data convergence protocol (PDCP) signaling, or a signal transfer scheme using a media access control control element (MAC CE). Also, the higher layer signaling or the upper signal may include system information such as a system information block (SIB) to be commonly transmitted to a plurality of UEs.

For a system that performs communication in an unlicensed band, a communication device (a BS or a UE) that attempts to transmit a signal in the unlicensed band may perform, before transmission of the signal, a channel access procedure or LBT on the unlicensed band in which the communication device performs communication, and may access the unlicensed band and perform signal transmission when it is determined that the unlicensed band is in an idle state according to the channel access procedure. When it is determined that the unlicensed band is not in the idle state according to the channel access procedure performed, the communication device may not perform signal transmission.

The channel access procedure in the unlicensed band may be classified by whether a time to initiate the channel access procedure of the communication device is fixed (frame-based equipment (FBE)) or variable (load-based equipment (LBE)). In addition to the time to initiate the channel access procedure, according to whether a transmit/receive structure of the communication device has a cycle or does not have a cycle, the communication device may be determined to be the FBE or the LBE. In this case, the time to initiate the channel access procedure being fixed means that the channel access procedure of the communication device may initiate periodically according to a predefined cycle or a cycle declared or configured by the communication device. As another example, the time to initiate the channel access procedure being fixed may mean that the transmit/receive structure of the communication device has a cycle. In this regard, the time to initiate the channel access procedure being variable means that the communication device may transmit a signal in an unlicensed band at any time. As another example, the time to initiate the channel access procedure being variable may mean that the transmit/receive structure of the communication device may be determined when required without having a cycle.

Hereinafter, a channel access procedure in a case that the time to initiate the channel access procedure of the communication device is variable, i.e., LBE, (hereinafter, referred to as the traffic based channel access procedure or the LBE based channel access procedure) will now be described.

The channel access procedure in an unlicensed band may include a procedure of measuring strength of a signal received by the communication device in the unlicensed band for a fixed time or a time calculated according to a predefined rule (e.g., a time calculated with at least a random value selected by the BS or the UE), and determining an idle state of the unlicensed band by comparing the measured strength of the signal with a predefined threshold or a threshold calculated by a function that determines the magnitude of the strength of the received signal according to at least one parameter among a channel bandwidth, a bandwidth in which a signal is to be transmitted, and/or strength of transmission power.

For example, the communication device may measure the strength of the received signal for a time X μs (e.g., 25 μs) immediately before a point in time to transmit a signal, may determine that the unlicensed band is in the idle state and may transmit a configured signal when the strength of the measured signal is less than a threshold T (e.g., −72 dBm) predefined or calculated in advance. In this case, after the channel access procedure, a maximum time available for continuous signal transmission may be restricted by a maximum channel occupancy time defined for each country, region, or frequency band based on each unlicensed band, and even by a type of the communication device (e.g., a BS or a UE, or a master device or a slave device). For example, in the 5 GHz unlicensed band for Japan, a BS or a UE may occupy a channel to transmit a signal without performing an additional channel access procedure for up to 4 ms for an unlicensed band determined to be in an idle state.

In more detail, when the BS or the UE attempts to transmit a DL or UL signal in the unlicensed band, a channel access procedure that may be performed by the BS or the UE may be identified as at least one of following types:

Type 1: transmitting a UL/DL signal after performing a channel access procedure for a variable time Type 2: transmitting a UL/DL signal after performing a channel access procedure for a fixed time Type 3: transmitting a DL or UL signal without performing, in a channel access procedure, a LBT procedure of determining channel occupancy by another node A transmitting device (e.g., a BS or a UE) which attempts to transmit a signal in an unlicensed band may determine a scheme (or a type) of the channel access procedure according to a type of the signal to be transmitted. In the 3GPP, an LBT procedure that is a channel access scheme may be classified into four categories. The four categories may include a first category including a scheme that does not perform LBT, a second category including a scheme that performs LBT without random backoff, a third category including a scheme that performs LBT through random backoff in a contention window with a fixed size, and a fourth category including a scheme that performs LBT through random backoff in a contention window with a variable size. According to an embodiment, the fourth category may be reserved for Type 1, the second category may be reserved for Type 2, and the first category may be reserved for Type 3.

In the disclosure, a transmitting device may be assumed to be a BS, and the transmitting device and the BS may be interchangeably used.

For example, when a BS attempts to transmit a DL signal including a DL data channel in an unlicensed band, the BS may perform a channel access procedure in a scheme of Type 1. Otherwise, when the BS attempts to transmit a DL signal that does not include a DL data channel in an unlicensed band, e.g., when the BS attempts to transmit a synchronization signal or a DL control channel, the BS may perform a channel access procedure in a scheme of Type 2 and may transmit a DL signal.

In this case, a scheme of the channel access procedure may be determined according to a transmission length of a signal to be transmitted via the unlicensed band or a length of a time or a period that occupies and uses the unlicensed band. In general, the channel access procedure in a scheme of Type 1 may be performed for a longer time than in a scheme of Type 2. Accordingly, when the communication device attempts to transmit a signal for a short time or a time equal to or less than a reference time (e.g., X ms or Y symbols), the channel access procedure may be performed in a scheme of Type 2. On the other hand, when the communication device attempts to transmit a signal for a long time or a time equal to or longer than the reference time (e.g., X ms or Y symbols), the channel access procedure may be performed in a scheme of Type 1. In other words, the channel access procedure may be performed in one of different schemes according to a use time of the unlicensed band.

When the transmitting device performs a channel access procedure in a scheme of Type 1 according to at least one of the aforementioned references, the transmitting device may determine a channel access priority class according to quality of a service class identifier (QCI) of the signal to be transmitted via the unlicensed band, and may perform the channel access procedure by using at least one of setting values predefined as in Table 1 for the determined channel access priority class. Table 1 represents mapping relations between the channel access priority class and the QCI.

For example, QCIs 1, 2, and 4 refer to QCI values for services such as Conversational Voice, Conversational Video (Live Streaming), and Non-Conversational Video (Buffered Streaming) When a signal for a service that does not match a QCI in Table 1 is to be transmitted in an unlicensed band, the transmitting device may select a QCI closest to the service from among QCIs in Table 4 and may select a corresponding channel access priority class.

TABLE 1

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

According to an embodiment, parameter values for a channel access priority class (e.g., defer duration according to the determined channel access priority p, a set (CW_p) of contention window values or sizes, minimum and maximum values (CW_min,p and CW_max,p) of a contention window, and an available maximum channel occupancy period (T_mcot,p)) may be determined as in Table 2. Table 2 represents parameter values for channel access priority types for DL.

Figure 6:
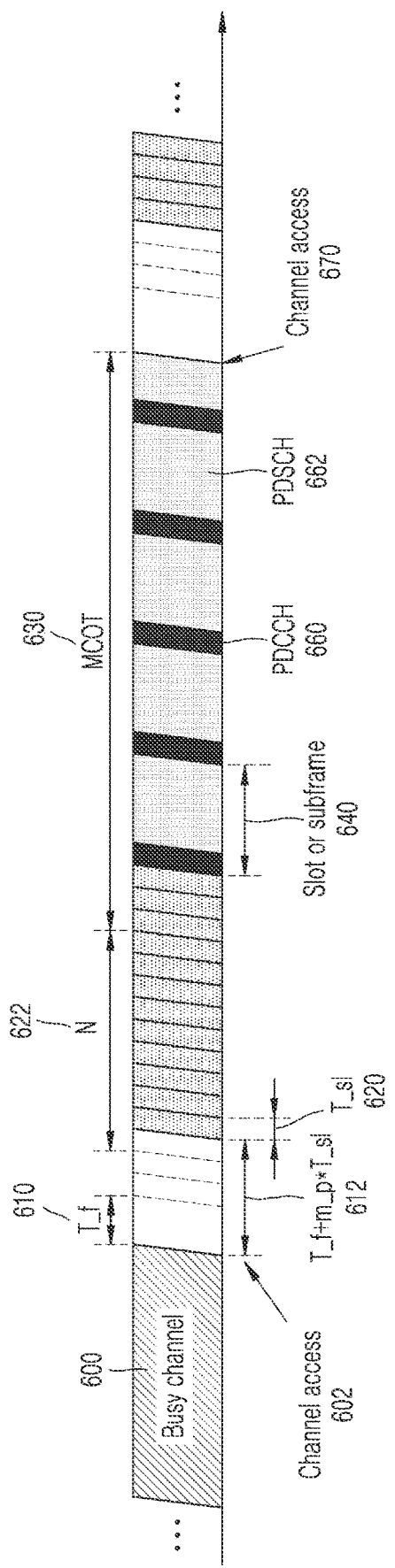
FIG. 6 illustrates a channel access procedure in an unlicensed band in a wireless communication system, according to an embodiment of the disclosure.

In other words, the BS attempting to transmit a DL signal in the unlicensed band may perform a channel access procedure on the unlicensed band for a minimum time T_f+m_p*T_sl (e.g., defer duration 612 of FIG. 6). When the BS attempts to perform a channel access procedure with a channel access priority class 3 (p=3), the size of T_f+m_p*T_sl, which is a size of T_f+m_p*T_sl of the defer duration required to perform the channel access procedure, may be configured by using m_p=3. In this case, T_f has a value fixed to 16 µs (e.g., duration 610 of FIG. 6), during which first T_sl time needs to be in an idle state, and for the remaining time (T_f−T_sl) after T_sl among T_f time, the BS may not perform the channel access procedure. Even when the BS performs the channel access procedure for the remaining time (T_f−T_sl), the result of the channel access procedure may not be used. In other words, T_f−T_sl refer to a time for which the BS defers performing the channel access procedure.

When it is determined that the unlicensed band is in the idle state for the whole time m_p*T_sl, N may be N−1 (N=N−1). In this case, N may be selected to be an arbitrary integer value from among values between 0 and a value (CW_p) in a contention window at a time to perform the channel access procedure. For the channel access priority class 3, a minimum contention window value and a maximum contention window value are 15 and 63, respectively. When an unlicensed band is determined to be in an idle state in the defer duration and additional duration during which a channel access procedure is to be performed, the BS may transmit a signal in the unlicensed band for the time T_mcot,p (8 ms). Table 2 represents a channel access priority class (or a channel access priority order) for DL. Embodiments of the disclosure will now be described based on the DL channel access priority class for convenience of descriptions. The channel access priority class in Table 2 may be equally used for UL, or a separate channel access priority class for UL may be used.

TABLE 2

| Channel Access Priority Class (p) | $m_p$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window value CW_p is a minimum value CW_min,p of the contention window. After selecting an N value, the BS may perform the channel access procedure during the period T_sl (e.g., slot length 620 of FIG. 6), and when the unlicensed band is determined to be in an idle state through the channel access procedure performed in the period T_sl, the BS may change the N value to be N=N−1 and may transmit a signal for the maximum T_mcot,p time (e.g., a maximum channel occupancy time 630 of FIG. 6) in the unlicensed band when N becomes 0 (N=0). When the unlicensed band determined through the channel access procedure is not in the idle state in the time T_sl, the BS may perform the channel access procedure again without changing the N value.

The amount of the value of the contention window CW_p may be changed or maintained according to a ratio (Z) of NACK among results (ACK/NACK) of reception of DL data (e.g., the DL data received in a reference subframe or a reference slot) transmitted or reported to the BS by one or more UEs which have received DL data transmitted via a DL data channel in the reference subframe or the reference slot. In this case, the reference subframe or the reference slot may be determined as a point in time for the BS to initiate a channel access procedure, a point in time for the BS to select an N value to perform the channel access procedure, the first subframe or a slot of the DL signal transmission period (or MCOT) involved in the most recent transmission of the BS in the unlicensed band immediately before the two points in time, or an initiation subframe or an initiation slot of the transmission period.

FIG. 6 illustrates an example of a channel access procedure in an unlicensed band in a wireless communication system, according to an embodiment of the disclosure. A situation in which a BS performs a channel access procedure to occupy an unlicensed band will now be described. The BS corresponds to the BS 110 of FIG. 1.

Referring to FIG. 6, the BS may attempt channel access to occupy the unlicensed band. A point in time for the BS to initiate a channel access procedure 670, a point in time for the BS to select an N value to perform the channel access procedure, or a first slot (or an initiation slot in which a channel occupancy time starts) and/or a subframe 640 of a DL signal transmission period (hereinafter, MCOT 630) involved in the most recent transmission of the BS in the unlicensed band immediately before the point in time may be defined as a reference slot or a reference subframe (hereinafter, the reference slot).

In detail, the reference slot may be defined as a slot or one or more consecutive slots including the first slot in which a signal is transmitted from among all slots of the DL signal transmission period (MCOT 630). Also, according to an embodiment, when the DL signal transmission period (MCOT 630) starts after a first symbol of a slot, the slot in which DL signal transmission starts and a slot after the slot in which DL signal transmission starts may be defined as the reference slot.

A ratio of NACK in DL data reception results transmitted or reported to the BS by one or more UEs that received DL data transmitted in the reference slot via a DL data channel is equal to or greater than Z, the BS may determine a value or a size of a content window, which is to be used in the channel access procedure 670 of the BS, to be a contention window larger than a contention window used in a previous channel access procedure 602. In other words, the BS may increase the size of the contention window used in the previous channel access procedure 602. The BS may perform the channel access procedure 670 by selecting an N value in a range defined according to the increased size of the contention window.

When the BS is unable to obtain a reception result of a DL data channel transmitted in the reference slot of the MCOT 630, for example, when a time period between the reference slot and the point in time for the BS to initiate the channel access procedure 670 corresponds to n slot or is equal to or smaller a symbol (in other words, when the BS initiates a channel access procedure before a minimum time in which the UE can report, to the BS, the reception result of the DL data channel transmitted in the reference slot), a first slot of a DL signal transmission period involved in the most recent transmission before the DL signal transmission period (MCOT 630) may become the reference slot.

In other words, when the BS is unable to receive, from the UE, the reception result of the DL data transmitted in the reference slot 640 in the point in time for the BS to initiate the channel access procedure 670, the point of time the BS selects the N value to perform the channel access procedure, or a point of time immediately before, the BS may determine a contention window by using a DL data reception result of the UE with respect to the reference slot in the DL signal transmission period of the most recent transmission from among reception results of a DL data channel which are previously received from UEs. The BS may determine the size of the contention window to be used in the channel access procedure 670, by using the DL data reception results of the DL data transmitted in the reference slot via the DL data channel, the results being received from the UEs.

For example, after the BS transmitted a DL signal through a channel access procedure (e.g., CW_p=15) configured based on the channel access priority class 3(p=3), when at least 80% of reception results from the UE with respect to DL data transmitted to the UE in the reference slot via the DL data channel, from among DL signals transmitted via the unlicensed band, is determined as NACK, the BS may increase the contention window from an initial value (CW_p=15) to a next contention window value (CW_p=31). However, a value of the ratio of 80% is merely an example, and thus is not limited to the example.

When at least 80% of the reception results from among reception results from the UE is determined not to be NACK, the BS may maintain the value of the contention window as its current value or may change the value of the contention window to its initial value of the contention window. In this regard, the change of the contention window may be commonly applied to all channel access priority classes or may be applied only to the channel access priority class used for the channel access procedure. However, a value of the ratio of 80% is merely an example, and thus is not limited to the example.

In this regard, a method by which the BS determines a reception result efficient for the change of the size of the contention window, the reception result being among the DL data reception results transmitted or reported to the BS by the UE with respect to the DL data transmitted via the DL data channel in the reference slot where the change of the size of the contention window is determined, in other words, a method of determining a Z value will now be described.

When the BS transmits one or more codewords (CWs) or TB to one or more UEs in the reference slot, the BS may determine the Z value as a ratio of NACK from among reception results transmitted or reported to the BS by the UE with respect to the received TB in the reference slot. For example, when two CWs or two TBs are transmitted in the reference slot to one UE, the BS may be received or be reported DL data signal reception results with respect to the two TBs from the UE. When a ratio (Z) of NACK among the two reception results is equal to or greater than a threshold (e.g., Z=80%) that is predefined or is configured between the BS and the UE, the BS may change or increase the size of the contention window.

In this regard, when the UE bundles DL data reception results with respect to one or more slots (e.g., M slots) including the reference slot and transmits or reports a bundled reception result to the BS, the BS may determine that the UE has transmitted M reception results. Then, the BS may determine a Z value as a ratio of NACK among the M reception results, and may change, maintain, or reset the size of the contention window.

When the reference slot is a second slot among the two slots included in one subframe, or a DL signal is transmitted in a next symbol after a first symbol starting from the reference slot, the BS may determine the reference slot and the next symbol as a reference slot, and may determine a Z value as a ratio of NACK among reception results transmitted or reported to the BS by the UE with respect to DL data received in the reference slot.

Also, according to an embodiment, in a case where scheduling information or DCI for a DL data channel to be transmitted by the BS is transmitted by a cell or frequency band equal to a cell or frequency band in which the DL data channel is transmitted, or in a case where the scheduling information or the DCI for the DL data channel to be transmitted by the BS is transmitted via the unlicensed band but is transmitted by a cell or frequency different from a cell by which the DL data channel is transmitted, when it is determined that the UE has not transmitted a reception result of DL data received in the reference slot, and when it is determined that a DL data reception result transmitted by the UE is determined as at least one of discontinuous transmission (DTX), NACK/DTX, or any state, the BS may determine a Z value by determining the reception result from the UE as NACK.

Also, according to an embodiment, in a case where the scheduling information or the DCI for the DL data channel to be transmitted by the BS is transmitted in a licensed band, when it is determined that a DL data reception result transmitted by the UE is determined as at least one of DTX, NACK/DTX, or any state, the BS may not reflect the reception result from the UE to Z that is a reference value in the change of the contention window. In other words, the BS may ignore the reception result from the UE and may determine a Z value.

Furthermore, according to an embodiment, in a case where the scheduling information or the DCI for the DL data channel to be transmitted by the BS is transmitted in the licensed band, when reception results of DL data with respect to the reference slot transmitted or reported to the BS by the UE includes a case where the BS did not actually transmit DL data (no transmission), the BS may ignore the reception results of DL data transmitted or reported to the BS by the UE and may determine a Z value.

Hereinafter, a channel access procedure in a case where a time to initiate the channel access procedure of a communication device is fixed (frame-based equipment (FBE)) (hereinafter, the frame-based channel access procedure or the FBE-based channel access procedure) will now be described with reference to FIG. 7.

Figure 7:
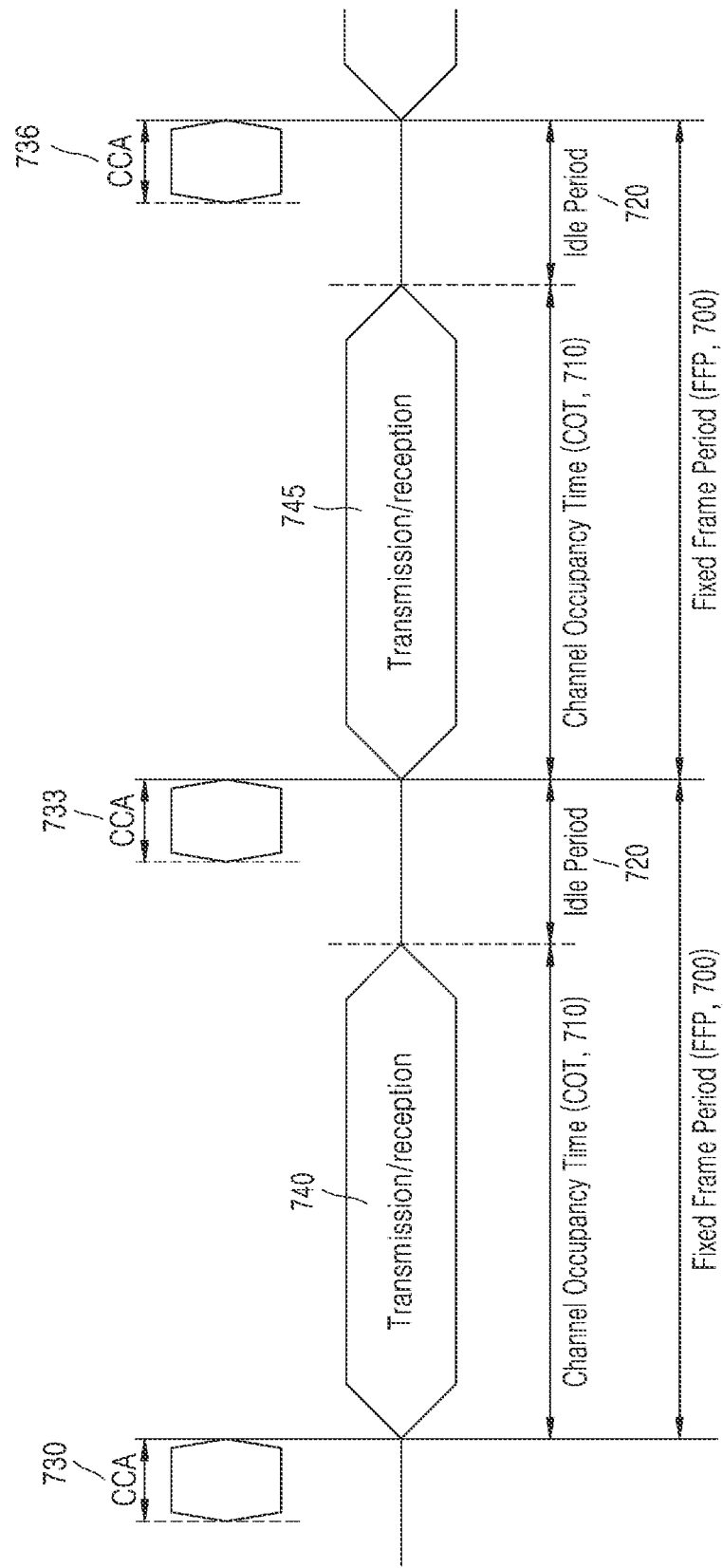
FIG. 7 illustrates a channel access procedure in an unlicensed band in a wireless communication system, according to an embodiment of the disclosure.

FIG. 7 illustrates another example of a channel access procedure in an unlicensed band in a wireless communication system, according to an embodiment of the disclosure.

The communication device that performs the frame-based channel access procedure may periodically transmit and receive signals according to a fixed frame period (FFP) 700. In this regard, the FFP 700 may be declared or configured by the communication device (e.g., a BS), and may be configured between 1 ms and 10 ms. Here, the channel access procedure (or a clear channel access (CCA)) for the unlicensed band may be performed immediately before the initiation of every frame period 730, 733, or 736, and the channel access procedure may be performed during a fixed time or one observation slot as in the channel access procedure of Type 2. Based on a result of the channel access procedure, when it is determined that the unlicensed band is in an idle state or is an idle channel, the communication device may transmit or receive a signal without separately performing a channel access procedure during at most 95% of a time of the FFP 700 (hereinafter, the COT 710). In this regard, at least 5% of the time of the FFP 700 corresponds to an idle period 720 during which a signal cannot be transmitted or received, and a channel access procedure may be performed in the idle period 720.

The frame-based channel access procedure has advantages in that, compared to a traffic-based channel access procedure, the frame-based channel access procedure may be relatively simple and may periodically perform a channel access to the unlicensed band. However, because the time to initiate the channel access procedure is fixed, the frame-based channel access procedure has disadvantages in that a probability to access the unlicensed band is reduced, compared to the traffic-based channel access procedure.

In the 5G system, it is requested to flexibly define a frame structure, in consideration of various services and requirements. For example, the services may have different subcarrier spacings, respectively, according to requirements. The current 5G communication system supports a plurality of subcarrier spacings, and each of the subcarrier spacings may be determined by using Equation 1.

$$\Delta f = f_0 2^m \qquad \text{Equation 1}$$

In Equation 1, $f_0$ denotes a default subcarrier spacing of a system, m denotes a scaling factor of an integer, and $\Delta$ denotes a subcarrier spacing. For example, when $f_0$=15 kHz, a set of subcarrier spacings allowed for the 5G communication system may be configured of one of 3.75 kHz, 7.5 kHz, 15 kHz, 30 kHz, 60 kHz, 120 kHz, 240 kHz, and 480 kHz. A set of allowed subcarrier spacings may vary according to frequency bands. For example, 3.75 kHz, 7.5 kHz, 15 kHz, 30 kHz, and 60 kHz may be used in a frequency band equal to or less than 6 GHz, and 60 kHz, 120 kHz, and 240 kHz may be used in a frequency band equal to or greater than 6 GHz.

According to an embodiment, a length of an OFDM symbol may be changed according to subcarrier spacings constituting the OFDM symbol. This is because characteristics of the OFDM symbol, and the subcarrier spacings and the length of the OFDM symbol have a reciprocal relation to each other. For example, when a subcarrier spacing is doubled, a symbol length is reduced in half, and when the subcarrier spacing is reduced in half, the symbol length is doubled.

Figure 8:
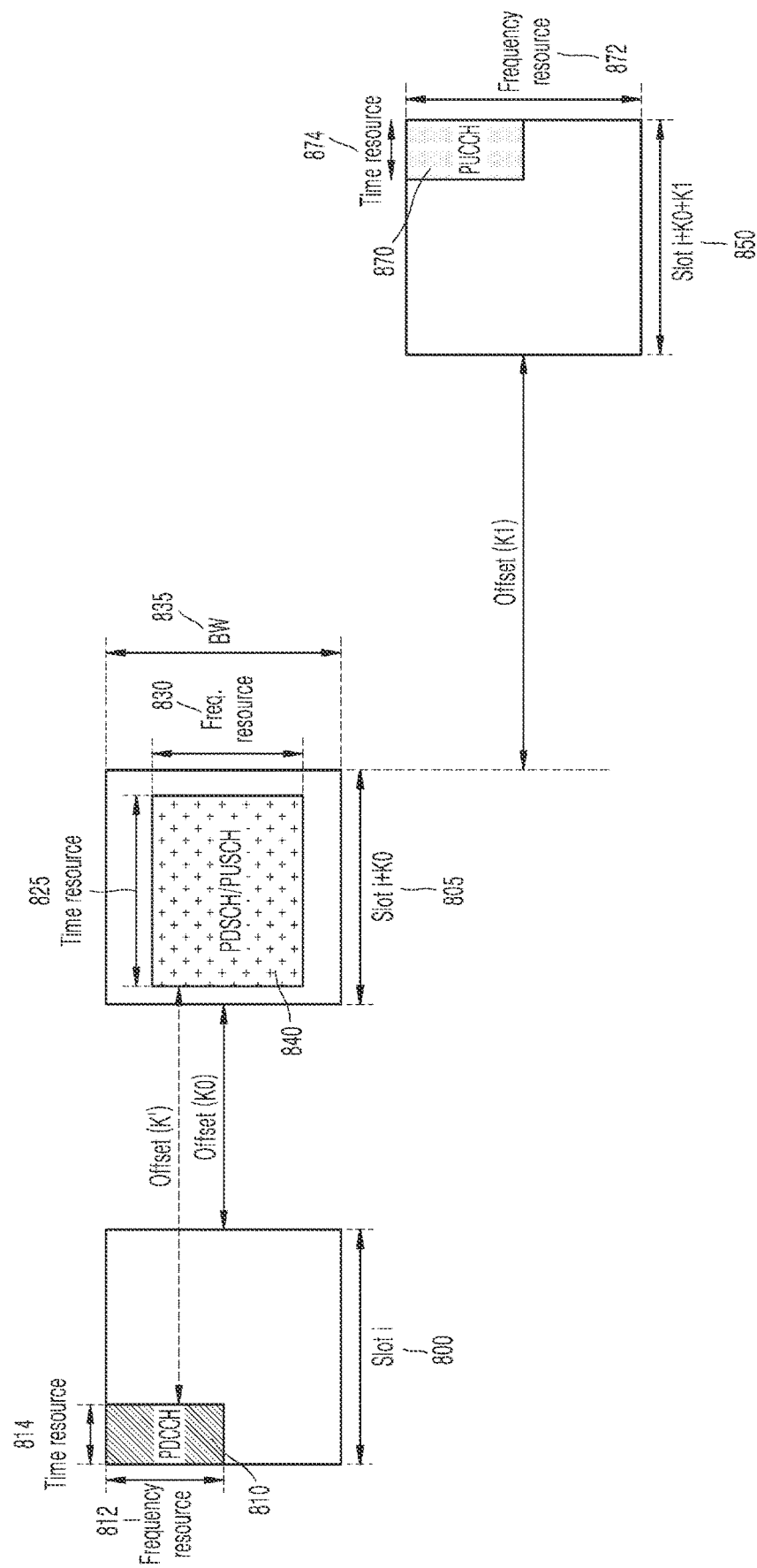
FIG. 8 illustrates an example of scheduling and feedback in a wireless communication system, according to an embodiment of the disclosure.

FIG. 8 illustrates an example of scheduling and feedback in a wireless communication system, according to an embodiment of the disclosure. A BS may transmit control information including DL and/or UL scheduling to a UE. The BS may transmit DL data to the UE. The UE may transmit, to the BS, HARQ-ACK information that is feedback on the DL data. Alternatively, the UE may transmit UL data to the BS. The BS corresponds to the BS 110 of FIG. 1. The UE corresponds to the UE 120 or the UE 130 of FIG. 1.

Referring to FIG. 8, a resource domain in which a data channel is transmitted in the 5G or NR communication system is illustrated. The UE may monitor and/or search for a PDCCH 810 in a DL control channel (PDCCH) domain (hereinafter a control resource set (CORESET) or a search space (SS)) configured in an upper signal from the BS. Here, the PDCCH domain consists of time domain information 814 and frequency domain information 812, and the time domain information 814 may be configured as a symbol unit, and the frequency domain information 812 may be configured as a RB or a group unit of RBs.

When the UE detects the PDCCH 810 in a slot i 800, the UE may obtain DCI transmitted via the detected PDCCH 810. The UE may obtain, from the received DCI, scheduling information of a DL data channel or UL data channel 840. In other words, the DCI may include at least information of a resource domain (or PDSCH transmission region) in which the UE is requested to receive a DL data channel (or PDSCH) transmitted from the BS, or information of a resource domain allocated from the BS to the UE for transmission of a UL data channel (or a physical uplink shared channel (PUSCH)).

A case in which the UE is scheduled for transmission of the UL data channel (or PUSCH) will now be described as an example. Upon reception of the DCI, the UE may obtain, from the DCI, a slot index or an offset K0 related to transmission of the PUSCH, and may determine a slot for transmission of the PUSCH. In this regard, a value of the offset K0 may include 0. For example, the UE may determine that a slot i+K0 805 is the slot for transmission of the PUSCH, by applying the offset information K0 obtained from the DCI, based on the slot index i 800 in which the PDCCH 810 or the DCI is received. Here, the UE may determine an initiation symbol and a length of the PUSCH in a slot i+K, based on time domain resource allocation information of the DCI.

Also, the UE may obtain, from the DCI, information about PUSCH transmission time-frequency resource domain 840 in the PUSCH transmission slot 805. PUSCH transmission frequency resource domain information 830 may include information of a PRB or a group unit of PRBs. Furthermore, the PUSCH transmission frequency resource domain information 830 may be information about a domain included in an initial UL bandwidth (BW) or an initial UL BWP, which is determined or configured via an initial access procedure. When the UE is configured with a UL BW or a UL BWP through an upper signal, the PUSCH transmission frequency resource domain information 830 may be information about a domain included in the UL BW or the UL BWP which is configured through an upper signal.

According to an embodiment, PUSCH transmission time resource domain information 825 may be information about a symbol or a group unit of symbols or may be information indicating absolute time information. The PUSCH transmission time resource domain information 825 may be represented with a PUSCH transmission initiation time, lengths of a symbol and PUSCH, a PUSCH transmission end time, or a combination of symbols and may be included as one field or value in the DCI. The UE may transmit the PUSCH in a PUSCH transport resource domain 840 determined from the DCI.

Various embodiments, upon reception of the PDSCH 840, the UE may transmit feedback on a reception result or a response signal (e.g., HARQ-ACK/NACK) of the PDSCH 840 to the BS. In this regard, a transport resource for a UL control channel (PUCCH) 870 in which the reception result of the PDSCH 840 is transmitted may be determined based on a PDSCH-to-HARQ timing indicator and a PUCCH resource indicator which are indicated by DCI transmitted via the PDCCH 810 that schedules the PDSCH 840. In other words, when the UE receives, from the DCI transmitted via the PDCCH 810, K1 that is the PDSCH-to-HARQ timing indicator, the UE may determine that a slot i+K0+K1 850 after K1 starting from the reception slot 805 of the PDSCH 840 is a slot in which the response signal is transmitted, i.e., a PUCCH transmission slot. In this regard, a transport resource for the PUCCH 870 in the PUCCH transmission slot 850 may be determined according to a PUCCH resource indicator of the DCI transmitted via the PDCCH 810. Also, a PUCCH transport resource may be determined, in consideration of at least one of the magnitude of a signal transmitted via the PUCCH 870, the number of bits (or payload), or a type of the signal to be transmitted (e.g., periodic CSI information, aperiodic CIS information, scheduling request information, a response signal, etc.) However, the disclosure is not limited thereto. Detailed descriptions of a method of determining the PUCCH transport resource are not provided.

The BS that transmits a DL signal via an unlicensed band has to perform a channel access procedure on the unlicensed band. Here, a point in time when the channel access procedure is completed may vary, and an initiation point in time of a slot or an initiation point in time of a symbol may be equal to or different from each other. Accordingly, a point in time or a symbol where transmission of a DL signal (e.g., a PDCCH or a PDSCH) can initiate may vary according to a point in time when the channel access procedure is completed. To this end, the BS assumes transmission of the DL signal in a predicted or available completion time of the channel access procedure, thereby performing DL signal scheduling and signal generation.

For example, the BS may perform DL signal scheduling and generate a signal, assuming that the channel access procedure can be completed in a random symbol within a slot. For example, the BS may perform DL signal scheduling with respect to symbol indices #0 to #13 and generate a signal, assuming a case where the channel access procedure is to be completed before a symbol index #0. Also, the BS may perform DL signal scheduling with respect to symbol indices #1 to #13 and generate a signal, assuming a case where the channel access procedure is to be completed after the symbol index #0 and before a symbol index #1. In the example above, the BS has to perform DL signal scheduling and generate a signal, assuming the number of available initiation symbols in one slot, e.g., 12 symbols from symbol #0 up to #12, in which DL signal transmission can start. In this regard, it is exemplary to assume 12 symbols, and the BS may assume more or less symbols than 12 symbols, according to a PDCCH monitoring time of the UE or a PDSCH scheduling reference or scheme of the BS.

In other words, when the UE that communicates with the BS by using an unlicensed band performs transmission and reception of a DL signal in at least one point in time or symbol within a slot, or when the UE is configured to receive a DL signal in at least one point in time or symbol within a slot, the BS may need to perform DL signal scheduling and generate a signal, based on a completion time of a channel access procedure, so as to efficiently use the unlicensed band. However, this increases complexity of the BS and requires unnecessary DL signal scheduling and generation of a signal, and thus, there is a need for a method for improving this. To this end, for the BS and the UE which support an initiation of one or more DL signals within a slot, the disclosure provides a DL signal transmitting and receiving scheme and a method of calculating a UE processing time thereof for the UE configured to receive a DL signal in at least one point in time or symbol within a slot.

Embodiment 1

When a transmission symbol for a DL signal is changed within a slot according to a channel access procedure in the BS and the UE which perform communication in an unlicensed band, Embodiment 1 provides a method of receiving, by the UE, the DL signal and a method of calculating, by the UE, a HARQ-ACK processing time.

As described above, the BS that transmits a DL signal via the unlicensed band has to perform a channel access procedure on the unlicensed band. In this regard, a point in time when the channel access procedure is completed may be equal to or different from a random point in time or symbol within a slot. Therefore, in order to transmit the DL signal (e.g., at least one channel from among a PDCCH and a PDSCH) immediately after the channel access procedure is completed, the BS has difficulty because the BS has to previously schedule and generate all DL signals that are transmittable in consideration of points in time or symbols in which completion of the channel access procedure is predicted. For example, the BS may assume that the channel access procedure can be completed in every symbol within the slot. That is, the BS may assume transmission of 14 available DL signals below. 1) transmission of PDCCH and PDSCH by using symbol #0 to symbol #13, 2) transmission of at least one channel of PDCCH and PDSCH by using symbol #1 to symbol #13, 3) transmission of at least one channel of PDCCH and PDSCH by using symbol #2 to symbol #13, . . . , 13) transmission of at least one channel of PDCCH and PDSCH by using symbol #12 to symbol #13, and 14) transmission of PDCCH in symbol #13 (Here, in this example, PDSCH of a length of 1 symbol is not considered.)

In order to solve a problem occurring because a completion time of the channel access procedure is not predictable, the BS may transmit a DL signal after completion of the channel access procedure as below. This will now be described with reference to FIG. 9.

The BS may perform a channel access procedure before at least a slot n so as to perform communication with the UE in a slot n via an unlicensed band. In this regard, the BS may schedule DL signal transmission, e.g., PDCCH1 and PDSCH1, the BS intends to transmit to the UE in the slot n.

When the channel access procedure is not completed before an initiation point in time of the slot n or an initiation of a first symbol of the slot n, the BS may perform the channel access procedure until the channel access procedure is completed. When the channel access procedure is completed immediately before a specific point in time 900 or a symbol k of the slot n, in other words, when it is determined that the unlicensed band is in an idle state, the BS may occupy the unlicensed band from the point in time 900 or the symbol k to a COT 905, and then may transmit a DL signal.

In this regard, the BS may puncture the pre-scheduled PDCCH1 and PDSCH1 (from symbol #0 to symbol #k−1) starting from a first symbol of a slot n up to a symbol before the DL signal transmission initiation point in time 900 or the symbol k, and may transmit the pre-scheduled PDCCH1 and PDSCH1 via remaining symbols (from symbol #k to symbol #13), such that the aforementioned problem may be solved, in which all transmittable DL signals have to be previously scheduled and generated, in consideration of a point in time or a symbol in which completion of the channel access procedure is predicted.

Figure 9:
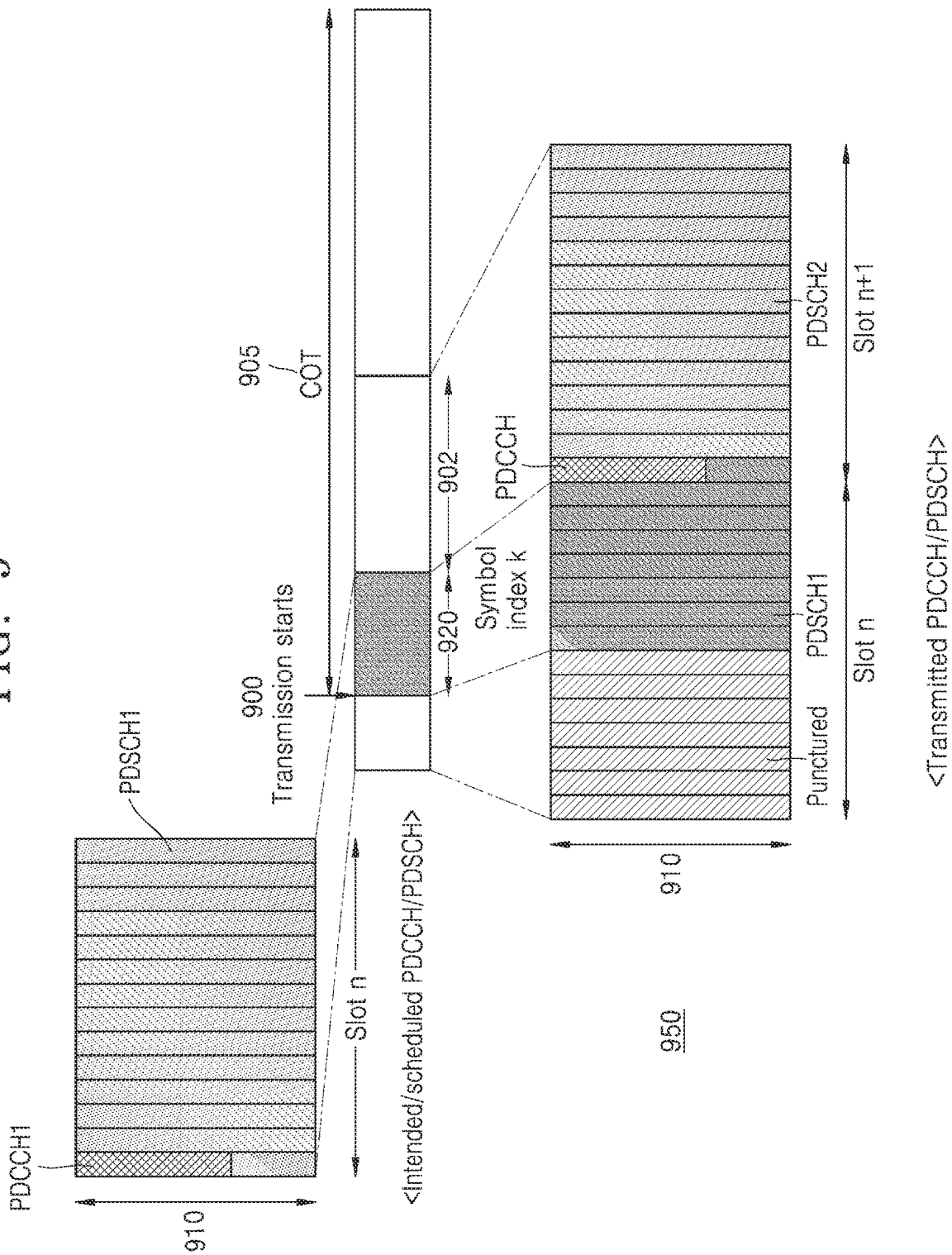
FIG. 9 is a diagram for describing downlink (DL) signal transmission in an unlicensed band according to an embodiment of the disclosure.

In this regard, the BS transmits a part of or all signals of the punctured PDCCH1 and PDSCH1 to the UE in the slot n or a slot after the slot n, such that the UE can correctly receive the PDCCH1 and PDSCH1. In FIG. 9, the pre-configured PDCCH1 is also punctured, such that the UE cannot receive scheduling information about the PDSCH1. In this regard, the BS transmits the scheduling information about the punctured PDSCH1 on a symbol in the slot or a symbol after the symbol in which the PDSCH1 is actually transmitted, or transmits scheduling information (DCI) about the PDSCH1 in a slot (e.g., slot n+1) after the slot n, such that the UE can correctly receive the PDSCH1 transmitted in the slot n. FIG. 9 illustrates a case in which DCI is transmitted via a PDCCH of a slot n+1. When the UE receives PDSCH scheduling information (DCI) in the slot n+1 from the BS, the UE may determine, by using methods below, whether the DCI is scheduling information about PDSCH1 in a slot n or is scheduling information about PDSCH2 in the slot n+1 or a slot after the slot n+1.

Method 1: Apply a Negative Integer to a K0 Value of Time Domain Resource Allocation Information of the DCI, and Determine Based on that For the method 1, the BS may configure or predefine, via an upper signal, that a negative integer value including at least K0,1=−1 is to be included in the K0 value of the time domain resource allocation information of the DCI. This will now be described below by using a default PDSCH time domain resource allocation table predefined between the BS and the UE, as in Table 3 below.

According to an embodiment, in the BS and the UE which perform communication in an unlicensed band, when some symbols among transmission symbols for a DL signal are punctured and transmitted according to a channel access procedure, or when the UE is configured to receive the DL signal, the UE may determine a time domain resource allocation region of a PDSCH scheduled via the DCI, by using the default PDSCH time domain resource allocation table (a table in which some or all of K0 are K0,1) as Table 3 below.

When it is not PDSCH transmission in the unlicensed band or the UE is not configured to receive the DL signal, the UE may determine the time domain resource allocation region of the PDSCH by using a PDSCH time domain resource allocation table (e.g., a table where K0,1=0) in which a K0 value is predefined or configured via an upper signal as a non-negative integer value.

Here, K0,1 may be defined or configured to be equal or different in each row index of the PDSCH time domain resource allocation table. Obviously, Table 3 is an example of a proposed method of the disclosure, and the disclosure is not limited thereto.

In other words, when a value of PDSCH time domain resource allocation information or the information indicates row index 1 of Table 3, the UE having received the DCI in the slot n+1 may determine that PDSCH (i.e., PDSCH1) scheduled by the DCI is allocated from symbol #2 to symbol #13 of a slot (e.g., slot n when K0,1=−1) before K0,1 slot starting from the slot n+1.

When a value of PDSCH time domain resource allocation information or the information indicates row index 2 of Table 3, the UE having received the DCI in the slot n+1 may determine that PDSCH (i.e., PDSCH2) scheduled by the DCI is allocated from symbol #3 to symbol #13 of the slot n+1.

As in the method 1, when the BS configures or predefines that a negative integer value including at least −1 is to be included in the K0 value of the time domain resource allocation information of the DCI, K0 uses a negative integer value with respect to a part of the PDSCH time domain resource allocation table, such that flexibility in implementation of the BS where K0 uses a value equal to or greater than 0 may be decreased. Therefore, to solve the problem, it is possible to increase a size of a PDSCH time domain resource allocation field of the DCI. For example, a current 4-bit size of the PDSCH time domain resource allocation field may be increased to 5 bits.

TABLE 3

Default PDSCH time domain resource allocation

| Row index | dmrs-TypeA-Position | PDSCH mapping type | $K_0$ | S | L |
|---|---|---|---|---|---|
| 1 | 2 | Type A | $K_{0,1}$ | 2 | 12 |
|  | 3 | Type A | 0 | 3 | 11 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 9 | 4 |
|  | 3 | Type B | $K_{0,1}$ | 10 | 4 |
| 7 | 2 | Type B | 0 | 4 | 4 |
|  | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | $K_{0,1}$ | 4 | 7 |
| 16 | 2, 3 | Type B | $K_{0,1}$ | 8 | 4 |

Method 2: Indicate PDSCH Transmission Region Via Separate Field Information of DCI As in the method 1, when the BS configures or predefines that a negative integer value including at least −1 is to be included in the K0 value of the time domain resource allocation information of the DCI, KA uses a negative integer value with respect to a part of the PDSCH time domain resource allocation table, such that flexibility in implementation of the BS where K0 uses a value equal to or greater than 0 may be decreased. Therefore, the method 2 involves adding a separate field to DCI, such that the UE having received PDSCH scheduling information (the DCI) in a slot n+1 from the BS may determine whether the DCI is scheduling information about PDSCH1 in a slot n or is scheduling information about PDSCH2 in the slot n+1 or a slot after the slot n+1.

For example, a bit string of an X-bit size may be added to the DCI, and PDSCH scheduling slot information may be determined via information of the bit string. A case in which a bit string of a 1-bit size is added will now be described as an example. When a bit is configured as 0 in the PDSCH scheduling information (the DCI) received in the slot n+1, the UE may determine a slot in which PDSCH is scheduled, a mapping type, time domain allocation information, and the like, according to PDSCH time domain resource allocation information of the DCI.

When a bit is configured as 1 in the PDSCH scheduling information (the DCI) received in the slot n+1, the UE may determine a PDSCH scheduling slot by using a K0,1 value predefined or configured via an upper signal, instead of a K0 value of a row index indicated by the PDSCH time domain resource allocation information of the DCI. Here, K0,1 may be defined or configured to be equal or different in each row index of the PDSCH time domain resource allocation table. In this regard, the UE may apply a K0,1 value, based on K0 indicated by the PDSCH time domain resource allocation information of the DCI. That is, it may be determined that K0=K0+K0,1. The UE may determine time domain allocation information such as a PDSCH mapping type, an initiation symbol and a length of the PDSCH, and the like, based on information excluding the K0 value from the PDSCH time domain resource allocation information of the DCI.

Furthermore, it is possible to determine, via an added bit, that a plurality of PDSCHs (PDSCH1 and PDSCH2 of FIG. 9) are scheduled in a plurality of slots. For example, when the bit is configured as 1, the UE may determine a slot in which PDSCH (e.g., PDSCH2) is scheduled, a mapping type, time domain allocation information, and the like, according to the PDSCH time domain resource allocation information of the DCI, and may additionally determine a scheduling slot of PDSCH1 by using the K0,1 value predefined or configured via the upper signal, instead of the K0 value of the row index indicated by the PDSCH time domain resource allocation information of the DCI. In this regard, with respect to PDSCH1, the UE may determine time domain allocation information such as a PDSCH mapping type, an initiation symbol and a length of the PDSCH, and the like, based on information excluding the K0 value from the time domain resource allocation information. Also, the UE may determine HARQ Process ID included in the DCI to be HARQ Process ID of PDSCH1, and may determine HARQ-Process ID of PDSCH2 to be HARQ Process ID+1 indicated by the DCI.

In this regard, the UE may determine whether the DCI schedules one PDSCH or schedules two PDSCHs, by configuring a size of a bit string to be added, or via a different bit string.

When the DCI for scheduling the PDSCH is transmitted after the PDSCH, the UE may decode the PDSCH after the DCI is received, such that an additional processing time is required to transmit a reception result, a response signal, or HARQ-ACK information with respect to the PDSCH.

In general, the UE is located distant from the BS, such that a signal transmitted from the UE is received by the BS after a propagation delay. The propagation delay refers to a value obtained by dividing a path on which a radio wave is transmitted from the UE to the BS, by the speed of light, and in general, refers to a value obtained by dividing a distance between the UE and the BS by the speed of light. For example, when the UE is located at a place distant from the BS by 100 km, a signal transmitted from the UE is received by the BS after about 0.34 msec. In an opposite case, a signal transmitted from the BS is received by the UE after about 0.34 msec. As described above, according to a distance between the UE and the BS, a time when a signal transmitted from the UE arrives at the BS may vary. Therefore, when a plurality of UEs positioned at different locations simultaneously transmit signals, an arrival-time to the BS may vary. In order to allow signals transmitted from the plurality of UEs to simultaneously arrive at the BS, the BS may differentiate a transmission time for each UE according to its location. This is referred to as timing advance in 5G, NR, and LTE systems.

Figure 10:
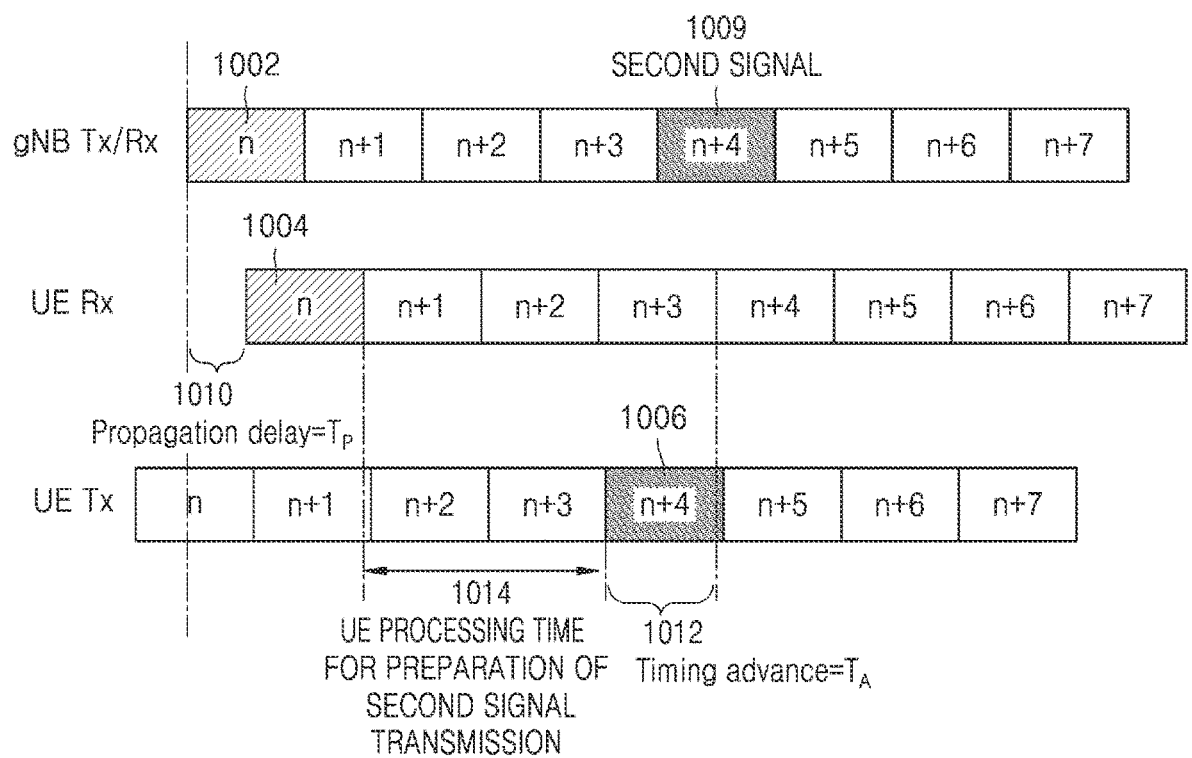
FIG. 10 is a diagram for describing a processing time of a UE according to timing advance according to an embodiment of the disclosure.

FIG. 10 is a diagram for describing a processing time of the UE according to timing advance, when the UE in the 5G or NR system receives a first signal (e.g., PDSCH) and then transmits a second signal (e.g., a reception result, a response signal, or HARQ-ACK information with respect to the first signal, or transmission of an UL data channel scheduled via the first signal).

Referring to FIG. 10, when the BS transmits a first signal, e.g., UL scheduling information (UL grant) or a DL control signal and DL data, to the UE in a slot n 1002, the UE may receive the first signal in a slot n 1004. Here, the UE may receive the first signal delayed by a propagation delay 1010, compared to a transmission time of the BS.

According to an embodiment, when the UE receives the first signal in the slot n 1004, the UE may receive, via the first signal, an indication to transmit a second signal in a slot n+4 1006. When the UE transmits the second signal to the BS, in order to allow a transmission signal to arrive at the BS at a particular time, the UE may transmit the second signal to the BS according to a timing 1006 advanced by timing advance (TA) 1012, compared to the slot n+4 1006 that is a reference based on the received first signal.

Therefore, in the present embodiment, a time the UE can prepare to receive UL scheduling grant and transmit UL data or to receive DL data and transmit HARQ ACK or NACK may be a time 1014 obtained by subtracting TA from a time corresponding to three slots (n+1, n+2, n+3).

In order to determine the aforementioned timing, the BS may calculate an absolute value of TA of the UE. The BS may calculate the absolute value of the TA by adding or subtracting variance in a TA value transmitted via higher layer signaling to or from a TA value this is first transmitted to the UE in a random access procedure. In the disclosure, an absolute value of TA may be a value obtained by subtracting an initiation time of an nth transmission time interval (TTI) received by the UE from an initiation time of an nth TTI transmitted by the UE.

Meanwhile, one of important references of a cellular wireless communication system capability is packet data latency. To this end, in the LTE system, a signal is transmitted or received in a unit of a subframe having a TTI of 1 ms. The LTE system operating as described above may support a short-TTI UE having a TTI shorter than 1 ms. In the 5G or NR system, a TTI may be shorter than 1 ms. The short-TTI UE is appropriate for a Voice over LTE (VoLTE) service, a remote control service, and the like for which latency is important. Also, the short-TTI UE is an entity capable of implementing cellular-based mission-critical Internet of things (IoT).

In the 5G or NR system, when the BS transmits PDSCH including DL data, DCI for scheduling the PDSCH may indicate a K1 value that is a value corresponding to timing information with which the UE transmits HARQ-ACK information about the PDSCH. In this regard, when a first symbol of PUCCH to be transmitted including the HARQ-ACK information indicated according to the K1 value includes timing advance, and thus does not initiate earlier than a symbol L1, the UE may transmit the PUCCH. In this regard, the symbol L1 may refers to a time or the number of symbols starting from a last symbol of the PDSCH to a time or a symbol immediately before an initiation of a first symbol of the PUCCH.

In other words, the BS may not indicate the UE to transmit a time or a symbol before the symbol L1, in consideration of timing advance, the time or the symbol starting from a time or a symbol after a last symbol in which the UE received the PDSCH up to a time or a symbol immediately before the first symbol of the PUCCH to be transmitted including the HARQ-ACK information about the PDSCH. Also, when the condition above is satisfied, the UE may transmit the HARQ-ACK information to the BS.

When it is indicated that the HARQ-ACK information including timing advance is to be transmitted earlier than the symbol L1, the UE may determine that the HARQ-ACK information is not valid, and thus, may not transmit the HARQ-ACK information to the BS, or the UE may assume or determine that a reception result with respect to the PDSCH is NACK, and thus, may transmit NACK to the BS. In this regard, the symbol L1 may be a first symbol in which a cyclic prefix (CP) starts after $T_{proc,1}$ starting from a last point in time of the PDSCH. $T_{proc,1}$ may be calculated using Equation 2 below. In this regard, a PDSCH processing time determined using Equation 2 is referred to as a first PDSCH processing time.

$$T_{proc,1} = (N_1 + d_{1,1})(2048 + 144) \cdot \kappa 2^{-\mu} \cdot T_c \qquad \text{Equation 2}$$

In Equation 2 above, $N_1$, $d_{1,1}$, k, μ, $T_C$ may be defined as below.

When HARQ-ACK information is transmitted via PUCCH (uplink control channel), $d_{1,1}=0$, and when transmitted via PUSCH (uplink shared channel, data channel), $d_{1,1}=1$.

When a position (11) or a symbol index of an additional DM-RS of PDSCH is 12, $N_{1,0}$ of Table 4 is 14, or otherwise, $N_{1,0}$ of Table 4 is 13.

When the UE is configured with a plurality of active component carriers or a carrier, a maximum timing difference between the carriers may be reflected on a first symbol of the PUCCH to be transmitted including the HARQ-ACK information.

In a case of PDSCH mapping type A, i.e., in a case where a position of a first DMRS symbol is a third or fourth symbol of a slot, when index i of a last symbol of the PDSCH is smaller than 7, $d_{1,1}=7-i$. When index i of the last symbol of the PDSCH is equal to or greater than 7, $d_{1,1}=0$.

In a UE with UE processing capability 1, in a case of PDSCH transmitted with PDSCH mapping type B, i.e., in a case where a position of a first DMRS symbol is a first symbol of the PDSCH, when a length of the PDSCH is 7 symbols, $d_{1,1}=0$, when a length of the PDSCH is 4 symbols, $d_{1,1}=3$, and when a length of the PDSCH is 2 symbols, $d_{1,1}=3+d$. Here, d refers to the number of symbols in which the PDSCH and PDCCH including a control signal (DCI) for scheduling the PDSCH overlap.

In a UE with UE processing capability 2, in a case of PDSCH transmitted with PDSCH mapping type B, i.e., in a case where a position of a first DMRS symbol is a first symbol of the PDSCH, when a length of the PDSCH is 7 symbols, $d_{1,1}=0$, and when a length of the PDSCH is 4 symbols, $d_{1,1}=d$. Here, d refers to the number of symbols in which the PDSCH and PDCCH including a control signal (DCI) for scheduling the PDSCH overlap. In the above case, when a length of the PDSCH is 2 symbols, in a case where the PDCCH including the control signal (DCI) for scheduling the PDSCH has been transmitted in a CORESET of 3-symbol length, and an initiation symbol of the CORESET is equal to that of the PDSCH, $d_{1,1}=3$, or otherwise, $d_{1,1}=d$.

$N_1$ is defined as in Table 4 below according to μ. μ=0, 1, 2, 3 respectively indicate subcarrier spacings of 15 kHz, 30 kHz, 60 kHz, 120 kHz. Here, a subcarrier spacing of PDCCH, a subcarrier spacing of PDSCH, and a subcarrier spacing of a UL channel transmitting HARQ-ACK may be equal or a subcarrier spacing of at least one of them may be different, and a subcarrier spacing that generates a greatest $T_{proc,1}$ value according to Equation 2 from among the subcarrier spacings is μ.

TABLE 4

| | PDSCH decoding time $N_1$ [symbols] | |
|---|---|---|
| μ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

TABLE 5

| μ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

Table 4 described above shows $N_1$ values provided by UE capability 1, and Table 5 shows $N_1$ values provided by UE capability 2. A UE supporting capability 2 may be configured, via an upper signal (e.g., Capability2-PDSCH-Processing of PDSCH-Config), to apply a processing time of one of Tables 4 to 5. For example, when the Capability2-PDSCH-Processing is enabled, the UE applies a processing time according to an $N_1$ value provided by UE capability 2, as in Table 5, or otherwise, applies a processing time according to an $N_1$ value provided by UE capability 2, as in Table 3.

That is, $T_c = 1 / (\Delta f_{max} \cdot N_f)$, $\Delta f_{max} = 480 \cdot 10^3 \text{Hz}$, $N_f = 4096$, $k = T_s / T_c = 64$, $T_s = 1 / (\Delta f_{ref} \cdot N_{f,ref})$, $\Delta f_{ref} = 15 \cdot 10^3 \text{Hz}$, $N_{f,ref} = 2048$ definitions may be made as above.

When subcarrier spacing μ=1 in the UE with UE processing capability 2, when PDSCH is allocated a frequency resource of more than 136 RBs, the UE follows an $N_1$ value provided by UE processing capability 1 as in Table 4. In a case where the UE has PDSCH (e.g., PDSCH2) that starts on a symbol within 10 symbols starting from a last symbol of PDSCH (e.g., PDSCH1), when PDSCH2 follows UE processing capability 2, a subcarrier spacing of at least one PDSCH from among PDSCH1 and PDSCH2 is 30 kHz (μ=1), and the PDSCH is allocated a frequency resource of more than 136 RBs and follows UE processing capability 1, the UE may not perform a decoding operation on PDSCH1. Here, PDSCH1 may refer to one or more PDSCHs.

In a case of PDSCH transmitted with PDSCH mapping type B, i.e., in a case where a position of a first DMRS symbol is a first symbol of the PDSCH, when a length of the PDSCH is 7 symbols, $d_{1,1}=0$, and when a length of the PDSCH is 4 symbols, $d_{1,1}=d$. Here, d refers to the number of symbols in which the PDSCH and PDCCH including a control signal (DCI) for scheduling the PDSCH overlap. In the above case, when a length of the PDSCH is 2 symbols, in a case where the PDCCH including the control signal (DCI) for scheduling the PDSCH has been transmitted in a CORESET of 3-symbol length, and an initiation symbol of the CORESET is equal to that of the PDSCH, $d_{1,1}=3$, or otherwise, $d_{1,1}=d$.

Accordingly, when the DCI for scheduling the PDSCH is transmitted on a symbol after an initiation symbol of the PDSCH, or when the DCI for scheduling the PDSCH is transmitted on a symbol after a last symbol of the PDSCH, the UE may decode the PDSCH after the DCI is received, such that an additional processing time is requested to transmit a reception result, a response signal, or HARQ-ACK information with respect to the PDSCH.

This will now be described below with reference to FIG. 11.

Figure 11:
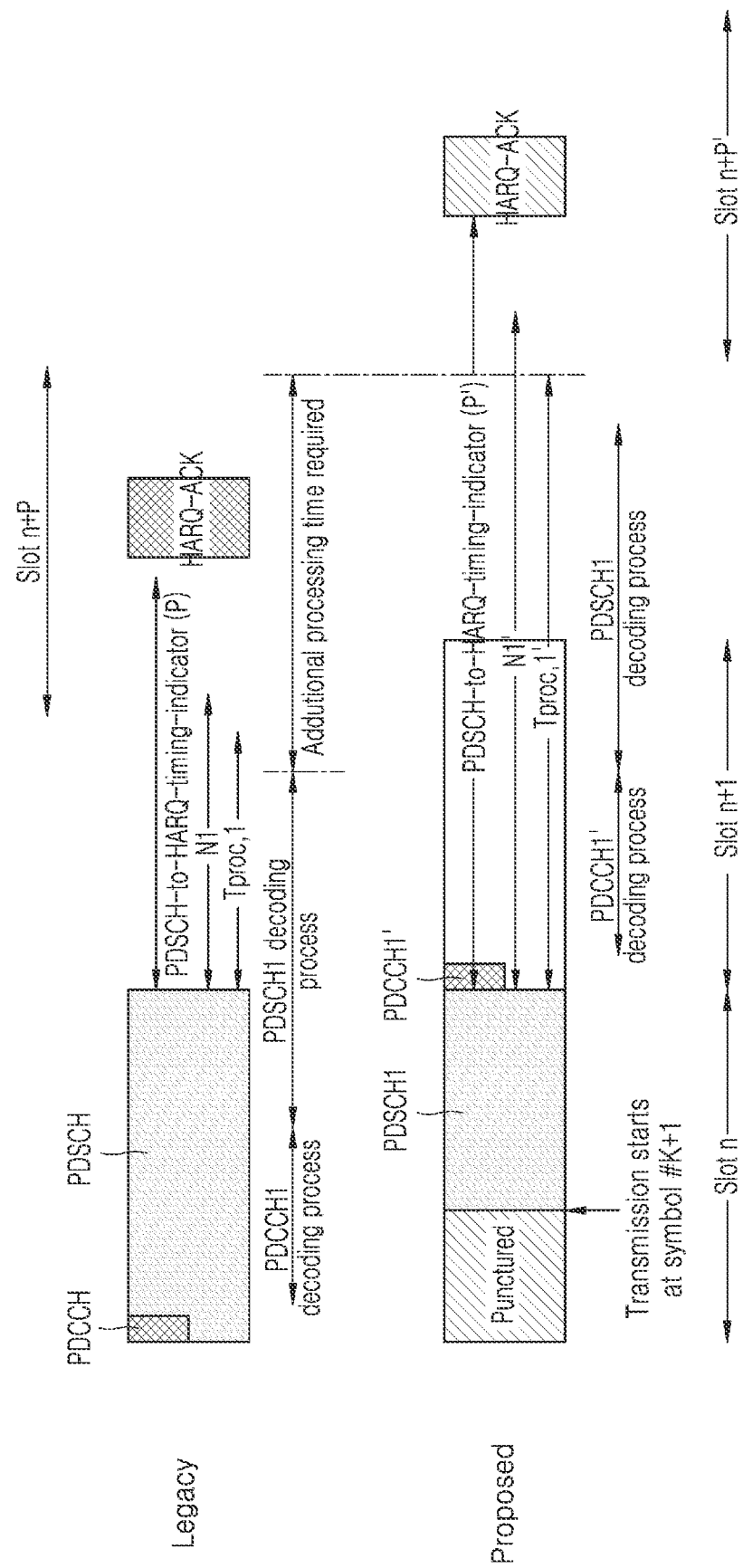
FIG. 11 is a diagram for describing an additional processing time according to an embodiment of the disclosure.

DCI for scheduling PDSCH or PDCCH for transmitting DCI is transmitted at a point in time equal to or earlier than the PDSCH, as shown in FIG. 11. The UE obtains the DCI through a procedure of receiving the PDCCH and decoding the PDCCH, and then checks whether the PDSCH is scheduled. In this regard, the PDCCH decoding procedure sequentially includes at least channel estimation (CE), demodulation, and decoding processes.

In this regard, the UE may additionally perform a preparation procedure to initiate a PDSCH decoding procedure. Afterward, the UE may initiate the PDSCH decoding procedure, and similarly, the PDSCH decoding procedure may include channel estimation (CE), demodulation, and decoding processes. Also, the UE may additionally perform a procedure such as HARQ-ACK preparation and UL transmission preparation for transmitting a PDSCH decoding result. The processing procedures may be smaller than $N_1$ defined as a minimum processing time or calculated $T_{proc,1}$. Afterward, the UE may transmit, to the BS, HARQ-ACK that is a reception result or a response signal with respect to the PDSCH via PUCCH or PUSCH which is determined via a PUCCH resource indicator and a PUCCH transmission timing indicator (PDSCH-to-HARQ_feedback timing indicator) which is indicated in the DCI. Here, an initiation symbol for transmission of the PUCCH or the PUSCH should not be initiated in a point in time or a symbol earlier than $N_t$ defined as the minimum processing time or the calculated $T_{proc,1}$.

However, as described above, when the DCI for scheduling the PDSCH is transmitted on the symbol after the initiation symbol of the PDSCH, or when the DCI for scheduling the PDSCH is transmitted on the symbol after the last symbol of the PDSCH, the UE may decode the PDSCH after the DCI is received, such that an additional processing time is requested to transmit a reception result, a response signal, or HARQ-ACK information with respect to the PDSCH.

This will now be described below with an example of FIG. 11. The BS schedules and generates PDCCH1 and PDSCH1 to be transmitted to the UE by using a symbol #0 to a symbol #13 of a slot n. However, when a channel access procedure is completed after a symbol #0 of the slot n, e.g., a symbol #K, the BS punctures the symbol #0 up to the symbol #K of the pre-scheduled PDCCH1 and PDSCH1, and transmits the scheduled PDCCH1 and PDSCH1 on a symbol #K+1 up to the symbol #13. Here, when PDCCH1 with respect to PDSCH1 is also punctured, the BS may transmit the PDCCH1 with respect to the PDSCH1 in a slot n+1.

Here, PDCCH1' transmitted for scheduling of the PDSCH1 in the slot n+1 may be equal to or different from PDCCH1 in the slot n. Also, values of at least one field of information of DCI1 transmitted via the PDCCH1 and information of DCI1' transmitted via the PDCCH1' may be equal or different. For example, a K0 value of the DCI1 and a K0 value of the DCI1' may be different.

In the afore-described case, the UE may obtain the DCI1' through a procedure of receiving the PDCCH1' and decoding the PDCCH1', and then may check whether the PDSCH1 is scheduled. Afterward, the UE may obtain a PDSCH decoding result through a PDSCH1 decoding procedure. Here, a procedure such as preparation of HARQ-ACK and preparation of UL transmission for transmitting the PDSCH decoding result may be additionally performed. Therefore, when a legacy method of calculating a PDSCH processing time is performed in the afore-described case, the BS may indicate the UE to transmit HARQ-ACK with respect to the PDSCH1 in a time (e.g., a slot n+P) in which processing with respect to actual PDSCH1 is not completed.

Therefore, as described above, when the DCI for scheduling the PDSCH is transmitted on the symbol after the initiation symbol of the PDSCH, or when the DCI for scheduling the PDSCH is transmitted on the symbol after the last symbol of the PDSCH, definition may be made between the BS and the UE so as to calculate a PDSCH processing time according to a new scheme, or an additional PDSCH processing time may be provided to a legacy PDSCH processing time calculate scheme, such that the UE may correctly transmit a reception result with respect to PDSCH1 to the BS. A case, as described above, in which it is requested to provide an additional PDSCH processing time X for the UE is when one of cases below is satisfied.

Case A: a case in which a first symbol of PDCCH that schedules PDSCH is transmitted after a first symbol of the PDSCH, Case B: a case in which a first symbol of PDCCH that schedules PDSCH is transmitted after a last symbol of the PDSCH, Case C: when it is determined that it is either Case A or Case B via at least one value from among values indicated by a time domain resource allocation field of PDCCH that schedules PDSCH, e.g., when a K0 value or an initiation symbol of the PDSCH indicates a value smaller than 0, Case D: when it is determined that it is Case A, Case B, or Case C via a particular field of PDCCH that schedules PDSCH, the BS may provide the additional PDSCH processing time X to a PDSCH processing time of the UE. That is, the BS may grant the additional PDSCH processing time X to the UE. The UE may obtain the additional PDSCH processing time X to the PDSCH processing time.

In this regard, a value of a processing time X may be defined as one or more symbol values or one or more slots. Here, a value of X may be configured via an upper signal. Also, the value of X may have one or more different values depending on cases. Also, the value of X may be determined according to the number of symbols between PDSCH and PDCCH. For example, the number of symbols may refer to the number of symbols (in FIG. 11, X=14 symbols) between a first symbol of PDCCH before being punctured, the PDCCH for scheduling PDSCH, and a first symbol of PDCCH after being punctured, the PDCCH for scheduling PDSCH. Because the PDCCH that schedules PDSCH has been transmitted after an X symbol starting from a scheduled PDCCH transmission initiation symbol, the X symbol is additionally provided to a PDSCH processing time of the UE.

However, provision of an additional processing time corresponding to a delay is merely an example, and the example may vary according to implementation of the UE. In other words, an additional processing time longer or shorter than the delay may be provided.

Also, according to an embodiment, the number of symbols may refer to the number of symbols (in FIG. 11, X=14 symbols) between a first symbol of PDSCH scheduled before being punctured and a first symbol of PDCCH for scheduling PDSCH. In this regard, regardless of the puncturing, it is possible to provide an additional processing time X as much as the number of symbols between a first symbol of the PDSCH and the first symbol of the PDCCH for scheduling the PDSCH. The aforementioned example is to additionally provide the UE with a time up to the first symbol of the PDCCH, based on a UE PDSCH processing time of a case where the first symbol of the PDCCH is transmitted at a time equal to or earlier than the first symbol of the PDSCH.

Also, according to an embodiment, a value of X may be the number of symbols between a last symbol of the PDSCH and a last symbol of the PDCCH. Similarly, a value of X may be the number of symbols between the first symbol of the PDSCH and the first symbol of the PDCCH. Also, a value of X may be the number of symbols between the first symbol of the PDSCH and the last symbol of the PDCCH, or a value of X may be the number of symbols between the last symbol of the PDSCH and the first symbol of the PDCCH. In other words, there is no limit in a value of X, and the value of X may vary according to implementation of the BS or the UE.

Here, the additional processing time X may be defined to the BS-the UE, as Equation 3 by adding $d_{1,2}$ to Equation 2. Where, a $d_{1,2}$ value is the value of X determined above. Here, a PDSCH processing time determined using Equation 3 is referred to as a second PDSCH processing time.

$$T_{proc,1} = (N_1 + d_{1,1} + d_{1,2})(2048 + 144) \cdot \kappa 2^{-\mu} \cdot T_c \quad \text{Equation 3}$$

As described above, when it is requested to provide the UE with an additional PDSCH processing time X proposed in the present embodiment, $d_{1,2}$=X, or otherwise, it may be determined that $d_{1,2}$=0.

Also, according to an embodiment, X may be included in a $d_{1,1}$ value of Equation 2 and Equation 3. For example, when it is requested to provide the UE with an additional PDSCH processing time X proposed in the disclosure, a value of X may be additionally provided to a $d_{1,1}$ value calculated using Equation 2.

For example, when the $d_{1,1}$ value determined according to Equation 2 is 0, $d_{1,1}$=X, when the du value determined according to Equation 2 is 3, $d_{1,1}$=3+X, and when the du value determined according to Equation 2 is 3+d, $d_{1,1}$=3+d+X. Here, when it is not requested to provide the UE with the additional PDSCH processing time X proposed in the present embodiment, a du value may be determined according to Equation 2. The PDSCH processing time determined according to the scheme described above is referred to as a second PDSCH processing time.

In this regard, in a case of the first PDSCH processing time (or in a case of Equation 2), a case where PDCCH for scheduling PDSCH is transmitted at a time equal to or earlier than the PDSCH and a case where the PDSCH is transmitted up to on a last symbol of a slot are assumed. Because a PDSCH processing time of the UE is determined at a last symbol of the PDSCH, when the PDSCH is transmitted up to only on a symbol (e.g., a symbol before a symbol #7) before the last symbol of the slot, or an additional DM-RS is transmitted, it is considered a case where an additional PDSCH processing time is provided to the UE. For example, when the additional DM-RS is transmitted, the UE cannot initiate a channel estimation procedure until the UE receives the additional DM-RS, and thus, the UE requires an additional processing time.

However, in a case where it is requested to provide the UE with an additional PDSCH processing time X proposed in the disclosure, when PDCCH for scheduling PDSCH is transmitted after a last symbol of the PDSCH, it may not be requested to provide a PDSCH processing time such as a first PDSCH processing time. For example, in the aforementioned case, after the UE already receives the PDSCH, the UE decodes the PDCCH so as to determine whether the PDSCH is scheduled, such that the UE can perform a PDSCH decoding procedure including channel estimation, without a need to wait to receive the additional DM-RS.

Therefore, when a processing time is calculated to provide the UE with an additional PDSCH processing time X proposed in the present embodiment, the processing time may be calculated by not using a $d_{1,1}$ value determined via a first PDSCH processing time calculation procedure or by determining the $d_{1,1}$ value as 0. Also, a position of the additional DM-RS of the PDSCH may not be considered. In other words, even when transmission of the additional DM-RS is configured in the PDSCH, a PDSCH processing time may be calculated by using a value of a value (dmrs-AdditionalPosition=pos0) of the left column of Table 4. Here, even when the position of the additional DM-RS of the PDSCH is considered, a minimum value of $N_{1,0}$ of Table 4, e.g., $N_{1,0}$=12, may be applied. In other words, from among cases where it is requested to provide the UE with an additional PDSCH processing time X proposed in the present embodiment, in a case where it is determined that an additional processing time provided via the first PDSCH processing time calculation procedure is unnecessary, e.g., a case where the PDCCH for scheduling the PDSCH is transmitted after the last symbol of the PDSCH, the additional PDSCH processing time such as the first PDSCH processing time may not be provided or a value of the additional PDSCH processing time may be determined as 0.

According to an embodiment, a timing indicator value for a value of a PUCCH transmission timing indicator (PDSCH-to-HARQ_feedback timing indicator) of DCI transmitted via the PDCCH is applied based on a PDSCH transmission slot. However, as described above, when the PDCCH for scheduling the PDSCH is transmitted in a slot after a slot in which the PDSCH is transmitted, the value of the PUCCH transmission timing indicator (PDSCH-to-HARQ_feedback timing indicator) of the DCI transmitted via the PDCCH is applied based on the slot in which the PDCCH is transmitted, such that an additional PDSCH processing time may be implicitly provided to the UE.

In other words, when the PDCCH for scheduling the PDSCH is transmitted in the slot in which the PDSCH is transmitted or in a previous slot thereof, the timing indicator value for the value of the PUCCH transmission timing indicator (PDSCH-to-HARQ_feedback timing indicator) of the DCI transmitted via the PDCCH may be applied based on the PDSCH transmission slot, and when the PDCCH for scheduling the PDSCH is transmitted in the slot after the slot in which the PDSCH is transmitted, the value of the PUCCH transmission timing indicator (PDSCH-to-HARQ_feedback timing indicator) of the DCI transmitted via the PDCCH may be applied based on the slot in which the PDCCH is transmitted. Here, when the PDCCH for scheduling the PDSCH is transmitted on a symbol after the last symbol of the PDSCH, the value of the PUCCH transmission timing indicator (PDSCH-to-HARQ_feedback timing indicator) of the DCI transmitted via the PDCCH may be applied based on a last symbol on which the PDCCH is transmitted.

Regardless of signal transmission in an unlicensed band or puncturing is used, the aforementioned embodiments may be applied to a case where the PDCCH for scheduling the PDSCH is transmitted at a time later than the PDSCH or a case where the PDSCH is transmitted at a time earlier than the PDCCH for scheduling the PDSCH. For example, when a first symbol of the PDCCH is transmitted on a symbol after a first symbol of the PDSCH, the method by which the BS provides an additional processing time to the UE may be applied.

Embodiment 2

The UE configured or indicated to transmit an UL signal or a channel (e.g., at least one of PUCCH, PUSCH, SRS, and PRACH) via an unlicensed band has to perform a channel access procedure before a first symbol on which transmission of the UL signal or the channel is configured or indicated. Here, according to a size of a gap between a UL signal or channel transmission initiation point in time configured or indicated to the UE and an UL/DL signal or channel end point in time before the initiation point in time, the UE may perform a channel access procedure of type 2 to type 3 and may transmit the UL signal or the channel which is configured or indicated. For example, when the size of the gap between the UL signal or channel transmission initiation point in time configured or indicated to the UE and the UL/DL signal or channel end point in time before the initiation point in time is 25 μs, the UE may perform a channel access procedure of type 2 for 25 μs. As another example, when the size of the gap between the UL signal or channel transmission initiation point in time configured or indicated to the UE and the UL/DL signal or channel end point in time before the initiation point in time is equal to or smaller than 16 μs, the UE may perform the channel access procedure of type 2 for 16 μs or may perform a channel access procedure of type 3.

Because UL/DL signal or channel transmission in the general LTE or NR system is performed in a unit of symbol, a case where the size of the gap is greater than 25 μs may occur. For example, when UL/DL communication is performed at subcarrier spacing of 15 kHz, a length of one symbol may be about 72 μs, and thus may be greater than a gap period size for performing a channel access procedure of type 2 to type 3. Therefore, in order to ensure a gap of a certain time, the BS or the UE may transmit the UL/DL signal or channel at a time within a symbol (e.g., from symbol length—requested gap length to symbol end time).

A signal or channel transmitted at a time of a part of a symbol may be an extended cyclic prefix (CP) with respect to a UL transmission initiation symbol configured or indicated to the UE by the BS, a signal or channel in which the entirety or a portion of a transmission initiation symbol is copied, or a signal or channel in the entirety or the portion of the transmission initiation symbol is cyclic-extended. Hereinafter, for convenience of description, it is expressed as cyclic extension in the disclosure. The cyclic-extended signal or channel may be transmitted on one or more symbols. For example, the entirety of a UL transmission initiation symbol (1) is cyclic-extended and transmitted on a symbol (1-1) immediately before the UL transmission initiation symbol (1) configured or indicated as UL transmission, and a cyclic-extended signal or channel of the UL transmission initiation symbol (1) (or a copied symbol (1-1)) configured or indicated as UL transmission may be transmitted on a previous symbol (1-2) thereof. The fact that the entirety of the UL transmission initiation symbol (1) is cyclic-extended and transmitted on the symbol (1-1) immediately before the UL transmission initiation symbol (1) configured or indicated as UL transmission may have an equal meaning that the UL transmission initiation symbol (1) is copied and transmitted on the symbol (1-1) or the UL transmission initiation symbol (1) is transmitted or retransmitted on the symbol (1-1).

An example of cyclic extension will now be described below. When a first OFDM symbol (1) allocated to configured or indicated UL signal or channel transmission is cyclic-extended, a time-continuous signal of a $T_{symb,l}^{\mu} - T_{ext} \leq t < T_{symb,l}^{\mu}$ time period before the first symbol may be expressed using Equation 4.

$$s_{l-1}^{(p,\mu)} = -s_l^{(p,\mu)}(t - N_{CP,l}^{\mu} T_c) \qquad \text{Equation 4}$$

$$T_{symb,l}^{\mu} - T_{ext} \leq t < T_{symb,l}^{\mu}$$

$$T_{symb,l}^{\mu} = (N_u^{\mu} - N_{CP,l}^{\mu}) T_c$$

Where, $s_l^{(p,\mu)}$ is a time-continuous signal of an antenna port p and subcarrier spacing μ in the OFDM symbol 1. $T_{ext}$ may be as in Table 6, and $T_{TA}$ may a timing advance (TA) applied to UL transmission configured or indicated to the UE. Equation 4 is merely an example of cyclic extension, and the disclosure is not limited to the equation. In Table 6, $C_2$, $C_3$ are integer values including at least 1, 2, and may be predefined between the BS and the UE or may be configured to the UE via an upper signal. Where, values of $C_2$, $C_3$ may be defined as $C_3$=ceiling(25 μs+$T_{TA}/T_{symb,l}^{\mu}$). Here, Table 6 is merely an example of expression of a cyclic extension period, and the disclosure is not limited to the equation.

TABLE 6

| Index | $\mu = 0$ | $\mu = 1$ | $\mu = 2$ |
|---|---|---|---|
| 0 | 0 | 0 | 0 |
| 1 | $T_{symb,1}{}^{\mu} - 25 \cdot 10^{-6}$ | $T_{symb,1}{}^{\mu} - 25 \cdot 10^{-6}$ | $2T_{symb,1}{}^{\mu} - 25 \cdot 10^{-6}$ |
| 2 | $C_2 T_{symb,1}{}^{\mu} - 16 \cdot 10^{-6} - T_{TA}$ | $C_2 T_{symb,1}{}^{\mu} - 16 \cdot 10^{-6} - T_{TA}$ | $C_2 T_{symb,1}{}^{\mu} - 16 \cdot 10^{-6} - T_{TA}$ |
| 3 | $C_3 T_{symb,1}{}^{\mu} - 25 \cdot 10^{-6} - T_{TA}$ | $C_3 T_{symb,1}{}^{\mu} - 25 \cdot 10^{-6} - T_{TA}$ | $C_3 T_{symb,1}{}^{\mu} - 25 \cdot 10^{-6} - T_{TA}$ |

A minimum time required for the UE to receive, from the BS, DCI (or UL grant) for scheduling PUSCH transmission, and to initiate the scheduled PUSCH transmission is referred to as a PUSCH preparation time, a processing time, or a minimum processing time of the UE. In more detail, the PUSCH preparation time of the UE may refer to a time between a symbol immediately after a last symbol on which PDCCH for transmitting UL scheduling information is received from the BS and a symbol immediately before a first symbol of UL signal or channel transmission indicated according to the scheduling information (i.e., time domain allocation information). When a PUSCH transmission initiation time the BS schedules to the UE is a time earlier than the minimum processing time of the UE, the UE may ignore the DCI and may not perform PUSCH transmission.

Hereinafter, in the disclosure, a time required for the UE to prepare PUSCH transmission configured or indicated by the BS will now be described as a representative example, but, the disclosure is not limited to the PUSCH transmission, and contents of the disclosure may be applied to UL signal or channel transmission including the PUSCH transmission such as transmission of PUCCH, SRS, PRACH, or the like.

When the UE is configured with transmission of a cyclic-extended signal or channel and/or determines that cyclic extension transmission is requested, for example, when the UE is indicated, via UL scheduling information, to transmit a cyclic-extended signal or channel, the UE has to perform transmission of the cyclic-extended signal or channel before a first symbol of UL signal or channel transmission indicated according to the scheduling information, and thus, a minimum processing time may need a minimum processing time in which a time for the UE to perform transmission of the cyclic-extended signal or channel is considered, and/or an additional minimum processing time requested for the UE to generate and transmit the cyclic-extended signal or channel.

This will now be further described. As described above, the 5G or NR system generally performs transmission and reception in a unit of a symbol, and thus, a minimum processing time of the UE may be expressed as the number of symbols (L2) starting from a symbol immediately after a last symbol of PDCCH for transmitting UL scheduling information to a symbol immediately before a transmission initiation symbol (or a first symbol) of a UL signal or channel indicated according to time domain resource allocation information of the scheduling information, and may be represented using Equation 5 below.

In this regard, L2 may be a first UL symbol on which a CP starts, immediately after the last symbol of the PDCCH, after $T_{proc,2}$ calculated by using Equation 5. Here, L2, $T_{proc,2}$ may be determined by considering a timing advance of the UE, and a time gap effect between a plurality of carriers or cells.

$$T_{proc,2} = \max((N_2 + d_{2,1})(2048 + 144) \cdot \kappa 2^{-\mu} \cdot T_c, d_{2,2}) \quad \text{Equation 5}$$

Where, $N_2$ may be a value determined according to UE processing capabilities and subcarrier spacings of Table 7 and Table 8. Here, $\mu=0, 1, 2, 3$ respectively indicate subcarrier spacings of 15 kHz, 30 kHz, 60 kHz, 120 kHz. Here, $\mu$ is a subcarrier spacing that generates a greatest $T_{proc,2}$ value as a result of Equation 6 from among a subcarrier spacing of PDCCH for transmitting UL scheduling information and a subcarrier spacing of PUSCH.

When only DM-RS is transmitted on a first symbol of a UL signal, $d_{2,1}=0$, or otherwise, $d_{2,1}=1$. Also, when the UL scheduling information indicates bandwidth part switching, $d_{2,2}$ refers to a time required for the UE to perform the bandwidth part switching. When the UL scheduling information does not indicate the bandwidth part switching, $d_{2,2}=0$.

TABLE 7

| $\mu$ | PUSCH preparation time N2 [symbols] |
|---|---|
| 0 | 10 |
| 1 | 12 |
| 2 | 23 |
| 3 | 36 |

TABLE 8

| $\mu$ | PUSCH preparation time N2 [symbols] |
|---|---|
| 0 | 5 |
| 1 | 5.5 |
| 2 | 11 for frequency range 1 |

Table 7 described above shows $N_2$ values provided by UE capability 1, and Table 8 shows $N_2$ values provided by UE capability 2. A UE supporting capability 2 may be configured to apply a processing time of one of Tables 4 to 5. For example, when processingType2Enabled of PUSCH-ServingCellConfig in an upper signal message is enabled, the UE applies a processing time according to a $N_2$ value provided by UE capability 2, as in Table 8, and otherwise, the UE applies a processing time according to a $N_2$ value provided by UE capability 1 of Table 8. Here, k and $T_c$ may be defined using Equation 6 below.

$$T_c = 1/(\Delta f_{max} \cdot N_f), \quad \text{Equation 6}$$
$$\Delta f_{max} = 480 \cdot 10^3 \text{Hz},$$
$$N_f = 4096,$$
$$k = T_s/T_c = 64,$$
$$T_s = 1/(\Delta f_{ref} \cdot N_{f,ref}),$$
$$\Delta f_{ref} = 15 \cdot 10^3 \text{Hz},$$
$$N_{f,ref} = 2048$$

In other words, when a gap or the number of symbols between a symbol immediately after a last symbol of PDCCH via which UL scheduling information is transmitted and a transmission slot (K2) and a transmission initiation symbol (or a first symbol) in the transmission slot of a UL signal or channel indicated by at least time domain resource allocation information of scheduling information is equal to or greater than at least L2 symbols, the UE may perform scheduled PUSCH transmission. When the gap or the number of the symbols between the symbol immediately after the last symbol of PDCCH via which the UL scheduling information is transmitted and the transmission initiation symbol (or the first symbol) in the transmission slot of the UL signal or channel indicated by at least time domain resource allocation information of the scheduling information is less than L2 symbols, the UE may ignore the UL scheduling information and may not perform PUSCH transmission.

Therefore, when the UE is configured to perform cyclic extension transmission or receives an indication of cyclic extension transmission via the UL scheduling information (e.g., when the UE is indicated to use one of indices 1, 2, 3 of Table 6), the UE may determine a minimum processing time according to a combination of one or more of methods below. Here, the UE and the BS may predefine that the UE uses cyclic extension transmission without receiving separate configuration information for indicating to perform the cyclic extension transmission, when the UE performs transmission or reception by using a cell operating in an unlicensed band.

When the UE and the BS predefine that the UE uses cyclic extension transmission or when the UE is configured, via an upper signal, to use the cyclic extension transmission, the UE may determine whether to transmit a UL signal or a channel, in consideration of an additional time X in addition to a minimum time requested to transmit the UL signal or the channel. Here, X may be a value equal to or greater than 0, e.g., X may be 1 symbol, and may be predefined between the BS and the UE or may be configured via an upper signal. Also, X may be differently defined or configured by at least one of a subcarrier spacing and a gap period size. Here, X may be the number of symbols on which a cyclic extension signal or channel is transmitted.

For example, in a case where the UE is indicated to perform PUSCH transmission and cyclic extension corresponding to X=1 and index 0 of Table 6, when a gap or the number of symbols between a symbol immediately after a last symbol of PDCCH via which UL scheduling information is transmitted and a transmission initiation symbol (or a first symbol) in a transmission slot of a UL signal or channel indicated by at least time domain resource allocation information of the scheduling information is less than a minimum processing time determined according to the aforementioned method (e.g., the UE may determine a PUSCH preparation time according to Table 9 or Table 10), the UE may ignore the UL scheduling information and may not perform PUSCH transmission. Even when the UE and the BS predefine that the UE uses cyclic extension transmission or the UE is configured, via an upper signal, to use cyclic extension transmission, if cyclic extension transmission is not actually used (e.g., if the UE is configured or indicated to perform cyclic extension corresponding to index 0 of Table 6, or a configured or indicated cyclic extension transmission period is 0), the UE may determine that X=0 in Table 9 or Table 10 or may determine a PUSCH preparation time according to Table 7 or Table 8. Also, the UE configured or indicated to perform cyclic extension transmission (e.g., when the UE is indicated to transmit a signal or channel with cyclic extension corresponding to index 1 of Table 6, or a configured or indicated cyclic extension transmission period is greater than 0) may determine, as a PUSCH preparation time, a time to which X=1 symbol with Table 7 or Table 8 is added or may determine a PUSCH preparation time according to Table 9 or Table 10.

For example, in a case where the UE is indicated to perform PUSCH transmission and cyclic extension corresponding to X=1 and index 1 of Table 6, when a gap or the number of symbols between a symbol immediately after a last symbol of PDCCH via which UL scheduling information is transmitted and a transmission initiation symbol (or a first symbol) in a transmission slot of a UL signal or channel indicated by at least time domain resource allocation information of the scheduling information is less than a minimum processing time determined according to the aforementioned method (e.g., the UE may determine, as a PUSCH preparation time, a time to which X=1 symbol with Table 7 or Table 8 is added or may determine a PUSCH preparation time according to Table 9 or Table 10), the UE may ignore the UL scheduling information and may not perform PUSCH transmission.

TABLE 9

| μ | PUSCH preparation time N2 [symbols] |
|---|---|
| 0 | 10 + X1 |
| 1 | 12 + X2 |
| 2 | 23 + X3 |
| 3 | 36 + X4 |

TABLE 10

| μ | PUSCH preparation time N2 [symbols] |
|---|---|
| 0 | 5 + X1 |
| 1 | 5.5 + X2 |
| 2 | 11 for frequency range 1 + X3 |

The additional time X described above may have values X1, X2, X3, and X4 that are equal or different according to subcarrier spacings as in Table 9 or Table 10, and an X value may be independently defined according to subcarrier spacings or may be configured via an upper signal.

In another method of reflecting cyclic extension on a minimum time for the UE to prepare transmission of a UL signal or a channel, a new parameter $d_x$ that is determined according to cyclic extension may be added to $T_{proc,2}$ as in Equation 7 below.

$$T_{proc,2} = \max((N_2 + d_{2,1} + d_x)(2048 + 144) \cdot \kappa 2^{-\mu} \cdot T_c, d_{2,2}) \quad \text{Equation 7}$$

Here, dx is a value determined according to cyclic extension, and when the UE is not configured to perform cyclic extension nor is not given configuration information related to the cyclic extension, dx may be 0. When the UE is configured to perform the cyclic extension or is given related configuration information, regardless of actual cyclic extension transmission, the UE may determine dx to be X. X may be an integer value equal to or greater than 0, and may be a value predefined between the BS and the UE or configured via an upper signal. Also, X may be differently defined or configured by at least one of a subcarrier spacing and a gap period size, and may indicate the number of symbols on which a cyclic extension signal or channel is transmitted.

Even when the UE is configured to perform the cyclic extension or is given the related configuration information, the UE may differently determine dx, according to actual cyclic extension transmission. For example, when cyclic extension transmission is not used (e.g., when the UE is configured or indicated to perform cyclic extension corresponding to index 0 of Table 6, or a configured or indicated cyclic extension transmission period is 0), the UE may determine dx to be 0, and when cyclic extension transmission is used (e.g., when the UE is configured or indicated to perform cyclic extension corresponding to index 1 of Table 6, or a configured or indicated cyclic extension transmission period is greater than 0), the UE may determine dx to be X.

As another method of reflecting cyclic extension on a minimum time for the UE to prepare transmission of a UL signal or a channel, provided is a method of determining a PUSCH preparation time (or a minimum processing time) of the UE, based on an initiation point in time or an initiation symbol of actual UL signal or channel transmission.

For example, as described above, a minimum processing time of the UE may be expressed as the number of symbols (L2) starting from a symbol immediately after a last symbol of PDCCH for transmitting UL scheduling information to a symbol immediately before a transmission initiation symbol (or a first symbol) of a UL signal or channel indicated according to time domain resource allocation information of the scheduling information, and may be represented using Equation 7 below.

In this regard, L2 may be a first UL symbol on which transmission of a CP or at least one of a cyclic-extended signal or a channel starts, immediately after the last symbol of the PDCCH, after $T_{proc,2}$ calculated by using Equation 7. Here, a timing advance of the UE, and a time gap effect between a plurality of carriers or cells may also be included in calculation with respect to L2 and $T_{proc,2}$.

As described above, an embodiment of the disclosure may be applied not only to PUSCH transmission by the UE but also applied to transmission of a UL signal or channel including PUCCH. For example, when cyclic extension transmission is used in PUCCH transmission by the UE, the cyclic extension transmission based on at least one of Equation 2, Table 4, and Table 5 may be considered for a minimum PDSCH processing time, as Equation 8, Table 11, and Table 12. For example, when cyclic extension transmission is configured or indicated, the UE may calculate a minimum PDSCH processing time such as L1 and $T_{proc,1}$ by using Equation 8.

$$T_{proc,1} = (N_1 + d_{1,1} + d_x)(2048 + 144) \cdot \kappa 2^{-\mu} \cdot T_c \qquad \text{Equation 8}$$

Here, dx is a value determined according to cyclic extension, and when the UE is not configured to perform cyclic extension nor is not given related configuration information, dx is 0. When the UE is configured to perform the cyclic extension or is given the related configuration information, regardless of actual cyclic extension transmission, the UE may determine dx to be X. X may be an integer value equal to or greater than 0, and may be a value predefined between the BS and the UE or configured via an upper signal. Also, X may be differently defined or configured by at least one of a subcarrier spacing and a gap period size, and may indicate the number of symbols on which a cyclic extension signal or channel is transmitted.

Even when the UE is configured to perform the cyclic extension or is given the related configuration information, the UE may differently determine dx, according to actual cyclic extension transmission. For example, when cyclic extension transmission is not used (e.g., when the UE is configured or indicated to perform cyclic extension corresponding to index 0 of Table 6, or a configured or indicated cyclic extension transmission period is 0), the UE may determine dx to be 0, and when cyclic extension transmission is used (e.g., when the UE is configured or indicated to perform cyclic extension corresponding to index 1 of Table 6, or a configured or indicated cyclic extension transmission period is greater than 0), the UE may determine dx to be X.

As another example, when the UE and the BS predefine that the UE uses cyclic extension transmission or when the UE is configured, via an upper signal, to use the cyclic extension transmission, the UE may determine whether to transmit a UL signal or a channel, in consideration of an additional time X in addition to a minimum time requested to transmit the UL signal or the channel Here, X may be a value equal to or greater than 0, e.g., X may be 1 symbol, and may be predefined between the BS and the UE or may be configured via an upper signal. Also, X may be differently defined or configured by at least one of a subcarrier spacing and a gap period size. Here, X may be the number of symbols on which a cyclic extension signal or channel is transmitted.

For example, in a case where the UE is indicated to perform transmission of PUSCH including HARQ-ACK information and cyclic extension corresponding to X=1 and index 0 of Table 6, when a gap or the number of symbols between a symbol immediately after a last symbol of PDSCH via which a DL data channel is transmitted and a first symbol of PUCCH which transmits HARQ-ACK information about the DL data channel is less than a minimum processing time determined according to the aforementioned method (e.g., the UE may determine a PDSCH processing time according to Table 4 or Table 5), the UE may not be able to provide valid HARQ-ACK information about the DL data channel.

Even when the UE and the BS predefine that the UE uses cyclic extension transmission or the UE is configured, via an upper signal, to use cyclic extension transmission, if cyclic extension transmission is not actually used (e.g., if the UE is configured or indicated to perform cyclic extension corresponding to index 0 of Table 6, or a configured or indicated cyclic extension transmission period is 0), the UE may determine that X=0 in Table 11 or Table 12 or may determine a PUSCH preparation time according to Table 4 or Table 5. Also, the UE configured or indicated to perform cyclic extension transmission (e.g., when the UE is indicated to transmit a signal or channel with cyclic extension corresponding to index 1 of Table 6, or a configured or indicated cyclic extension transmission period is greater than 0) may determine, as a PUSCH preparation time, a time to which X=1 symbol with Table 4 or Table 5 is added or may determine a PUSCH preparation time according to Table 11 or Table 12.

For example, in a case where the UE is indicated to perform transmission of PUSCH including HARQ-ACK information and cyclic extension corresponding to X=1 and index 1 of Table 6, when a gap or the number of symbols between a symbol immediately after a last symbol of PDSCH via which a DL data channel is transmitted and a first symbol of PUCCH which transmits HARQ-ACK information about the DL data channel is less than a minimum processing time determined according to the aforementioned method (e.g., the UE may determine, as a PUSCH preparation time, a time to which X=1 symbol with Table 4 or Table 5 is added, or a PDSCH processing time determined based on Table 11 or Table 12), the UE may not be able to provide valid HARQ-ACK information about the DL data channel

TABLE 11

PDSCH decoding time N1 [symbols]

| μ | dmrs-AdditionalPosition = pos0 in DMRS-DownlinkConfig in both of dmrs-DownlinkForPDSCHMappingTypeA, dmrs-DownlinkForPDSCH-MappingTypeB | dmrs-AdditionalPosition ≠ pos0 in DMRS-DownlinkConfig in either of dmrs-DownlinkForPDSCHMappingTypeA, dmrs-DowntinkForPDSCH-MappingTypeB or if the higher layer parameter is not configured |
|---|---|---|
| 0 | 8 + X1 | $N_{1,0} + \chi 1$ |
| 1 | 10 + X2 | 13 + X2 |
| 2 | 17 + X3 | 20 + X3 |
| 3 | 20 + X4 | 24 + X4 |

TABLE 12

| μ | PDSCH decoding time N1 [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 + X1 |
| 1 | 4.5 + X2 |
| 2 | 9 for frequency range 1 + X3 |

The additional time X described above may have values X1, X2, X3, and X4 that are equal or different according to subcarrier spacings as in Table 9 or Table 10, and the value may be independently defined according to subcarrier spacings or may be configured via an upper signal.

Figure 12:
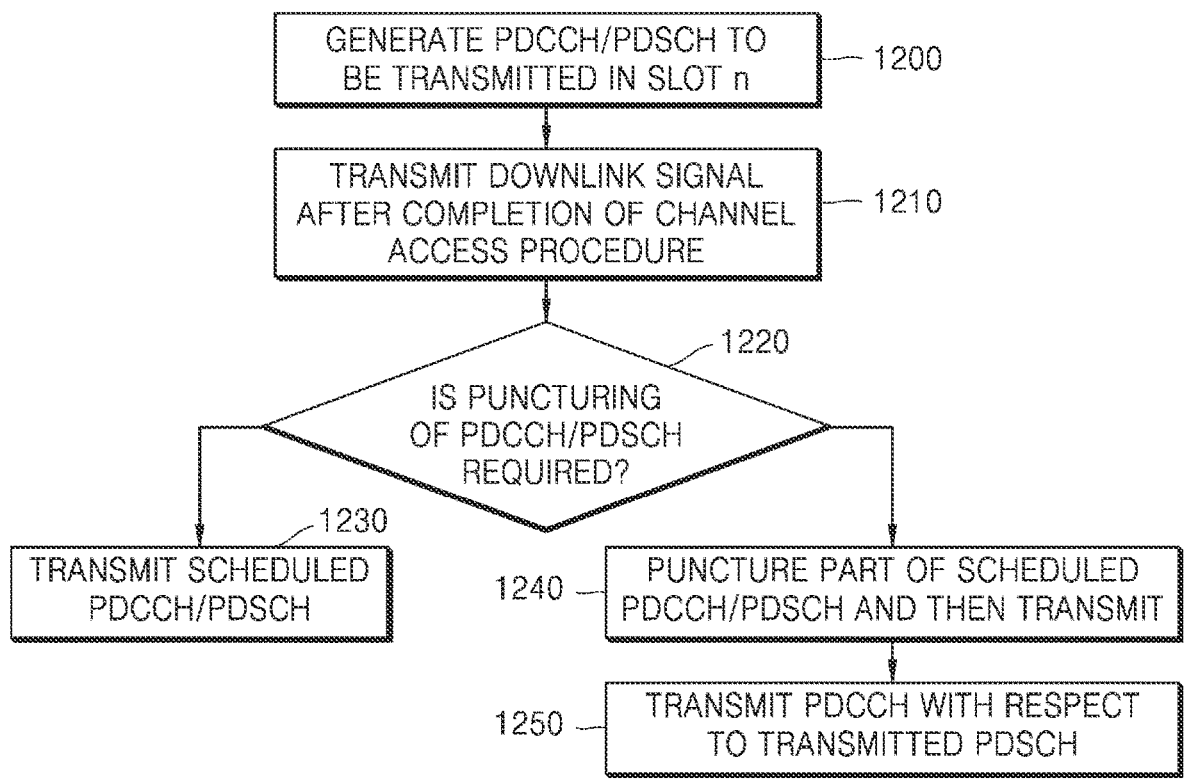
FIG. 12 illustrates an operation flow of a BS according to an embodiment of the disclosure.

FIG. 12 illustrates an operation flow of a BS according to various embodiments of the disclosure. The BS may refer to the BS 110 of FIG. 1. The operation flow of FIG. 12 may be performed by operations of respective elements of the BS.

Referring to FIG. 12, in operation 1200, the BS may select a UE to which at least one channel of PDCCH and PDSCH is to be transmitted in a slot n, and may schedule PDCCH or PDSCH to be transmitted to the selected UE and generate a channel. In operation 1210, the BS performs a channel access procedure with respect to an unlicensed band before the slot n, and transmits a DL signal after the channel access procedure is completed.

In operation 1220, when the BS determines that the channel access procedure is completed before a transmission time of PDCCH or PDSCH generated in the slot n in operation 1200, the BS transmits PDCCH or PDSCH generated in operation 1200, in operation 1230. In this regard, in consideration of a first PDSCH processing time of the UE, the BS indicates a PUCCH resource indicator and a PUCCH transmission timing indicator (PDSCH-to-HARQ_feedback timing indicator) so as to enable the UE to transmit, to the BS, a reception result with respect to PDSCH.

In operation 1220, when the BS determines that the channel access procedure is completed after the transmission time of PDCCH or PDSCH generated in the slot n in operation 1200, the BS may puncture PDCCH or PDSCH symbols starting from a transmission time of PDCCH or PDSCH generated in the slot n up to a completion time of the channel access procedure and may transmit PDCCH or PDSCH except the punctured PDCCH or PDSCH in operation 1240. When PDCCH is punctured in operation 1240, the BS may transmit PDCCH with respect to PDSCH transmitted in operation 1240, in operation 1250.

In this regard, PDCCH may be transmitted in a slot n+1 or a slot thereafter, or may be transmitted during PDSCH transmission in a slot n or on a symbol after PDSCH. In operation 1250, the BS may provide various types of a UE additional PDSCH processing time proposed in the disclosure, thereby enabling the UE to transmit, to the BS, a reception result with respect to PDSCH. In other words, in consideration of a second PDSCH processing time, the BS may indicate a PUCCH resource indicator and a PUCCH transmission timing indicator (PDSCH-to-HARQ_feedback timing indicator) so as to enable the UE to transmit, to the BS, a reception result with respect to the PDSCH.

That is, the disclosure relates to a communication technique and a system therefor, which converge an IoT technology and a 5G communication system for supporting a higher data rate after a 4G system. The disclosure is applicable to intelligent services (e.g., smart home, smart building, smart city, smart car or connected car, health care, digital education, retail, security, and safety services) based on 5G communication technology and IoT technology. According to various embodiments of the disclosure, an operating method of the BS in a wireless communication system includes a procedure of performing a channel access procedure in an unlicensed band, a procedure of transmitting a DL signal based on the channel access procedure, and a procedure of determining and indicating a response signal transmission available time with respect to the DL signal, based on transmission of the DL signal, in consideration of a DL signal processing time of the UE.

Figure 13:
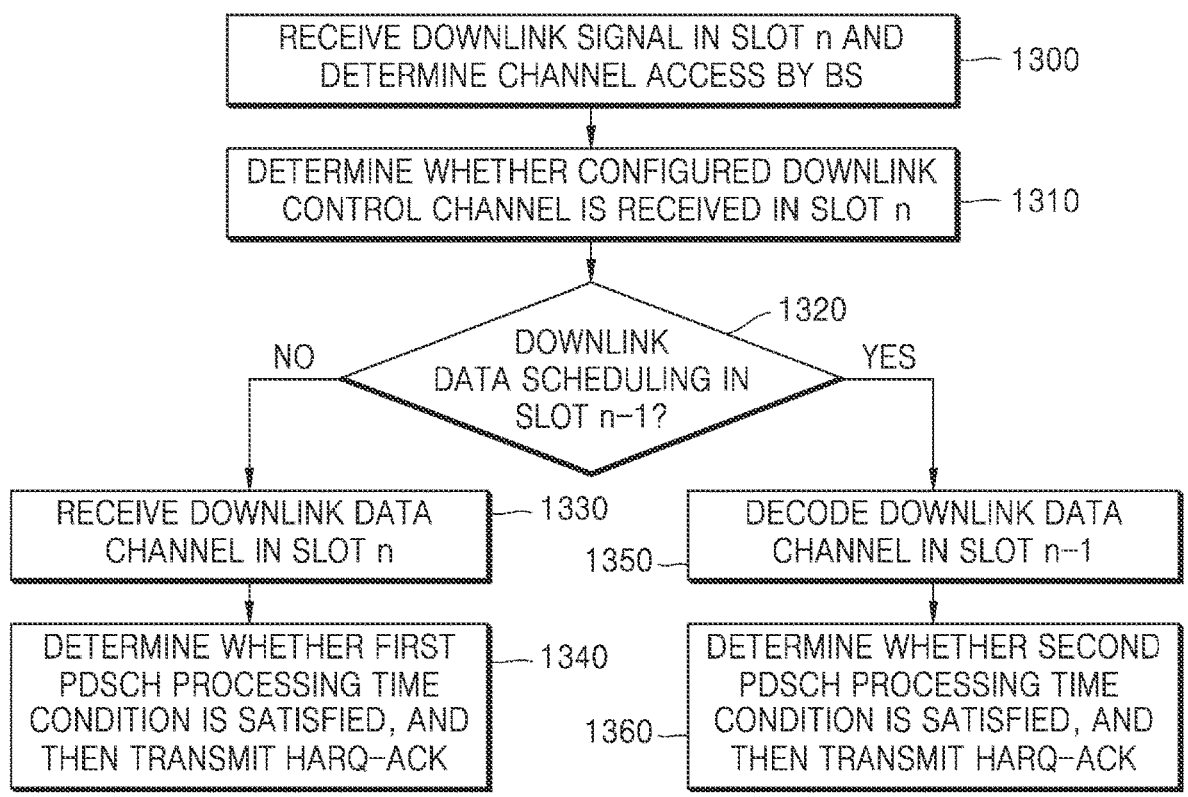
FIG. 13 illustrates an operation flow of a UE according to an embodiment of the disclosure.

FIG. 13 illustrates a flowchart in a UE according to various embodiments of the disclosure. The UE may refer to the UE 120 or 130 of FIG. 1. The operation flow of FIG. 13 may be performed by operations of respective elements of the UE.

Referring to FIG. 13, in operation 1300, the UE may determine a channel access by the BS. In order to determine the channel access by the BS, the US may receive a DM-RS transmitted from the BS or may receive an initial signal or a preamble transmitted when the BS starts an unlicensed band channel access, thereby determining the channel access by the BS. Here, the UE may determine the channel access by the BS by receiving a channel occupancy time structure or a slot format indicator transmitted from the BS via PDCCH. In this regard, the UE may perform operation 1310 without performing operation 1300.

In operation 1310, the UE may receive DL control information. In operation 1320, according to various embodiments, when the UE determines that a DL data channel scheduled based on the DL control information received in operation 1310 is a slot before a reception slot of the DL control information received in operation 1310 or is a slot equal to the reception slot of the DL control information received in operation 1310 but when it is determined that the DL control information is received after an initiation symbol of the DL data channel, in operation 1350, the UE may decode the DL data channel determined based on the DL control information received in operation 1310.

In operation 1360, the UE may transmit, to the BS, HARQ-ACK as a result of reception with respect to the DL data channel. When PUCCH indicated to transmit HARQ-ACK via a PUCCH resource indicator and a PUCCH transmission timing indicator (PDSCH-to-HARQ_feedback timing indicator) In operation 1310 or a PUSCH initiation symbol for transmitting the HARQ-ACK satisfies a second PDSCH processing time condition, the UE transmits HARQ-ACK to the BS.

When the second PDSCH processing time condition is not satisfied, the UE may not transmit HARQ-ACK with respect to PDSCH, or may determine a reception result with respect to the PDSCH, as NACK, and may transmit the NACK to the BS. In this regard, determining the reception result with respect to the PDSCH, as the NACK, includes that a PDSCH decoding procedure is not performed and the reception result with respect to the PDSCH is determined as the NACK.

In operation 1320, when a first symbol of PDCCH the UE receives in operation 1310 is equal to or earlier than a first symbol of PDSCH scheduled via the PDCCH, in operation 1330, the UE decodes the PDSCH scheduled via the PDCCH in operation 1310.

In operation 1340, the UE may transmit, to the BS, HARQ-ACK as a result of reception with respect to the DL data channel. When PUCCH indicated to transmit HARQ-ACK via a PUCCH resource indicator and a PUCCH transmission timing indicator (PDSCH-to-HARQ_feedback timing indicator) In operation 1340 or a PUSCH initiation symbol for transmitting the HARQ-ACK satisfies a first PDSCH processing time condition, the UE transmits HARQ-ACK to the BS.

When the first PDSCH processing time condition is not satisfied, the UE may not transmit HARQ-ACK with respect to PDSCH, or may determine a reception result with respect to the PDSCH, as NACK, and may transmit the NACK to the BS. In this regard, determining the reception result with respect to the PDSCH, as the NACK, includes that a PDSCH decoding procedure is not performed and the reception result with respect to the PDSCH is determined as the NACK.

In the disclosure, the expressions such as "equal to or greater than" or "equal to or less than" are used to determine whether a particular condition (or criterion) is fulfilled, but the expressions may not exclude meaning of "exceeding" or "less than" A condition written with "equal to or greater than" may be replaced with "exceeding", a condition with "equal to or less than" may be replaced with "less than", and a condition with "equal to or greater than and less than . . . " may be replaced with "exceeding . . . and equal to or less than . . . ".

The methods according to the embodiments of the disclosure described in the claims or the detailed description may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to cause the electronic device to execute the methods according to the embodiments of the disclosure described in the claims or the detailed description.

The programs (e.g., software modules or software) may be stored in RAM, non-volatile memory including flash memory, ROM, electrically erasable programmable read-only memory (EEPROM), a magnetic disc storage device, a CD-ROM, a DVD, another type of optical storage device, or a magnetic cassette. Alternatively, the programs may be stored in a memory including a combination of some or all of the above-mentioned memory devices. In addition, each memory may refer to a plurality of memories.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to a device according to the embodiments of the disclosure. Another storage device on the communication network may also be connected to the device performing the embodiments of the disclosure.

In the afore-described embodiments of the disclosure, elements included in the disclosure are expressed in a singular or plural form according to the embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, the embodiments of the disclosure described with reference to the present specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments may be combined to be implemented, when required. For example, portions of the methods provided by the disclosure may be combined with each other to enable the BS and the UE to operate. Also, although the embodiments are described based on 5G and NR systems, modifications based on the technical scope of the embodiments may be applied to other communication systems such as LTE, LTE-A, LTE-A-Pro systems, or the like.

The invention claimed is:

1. A method performed by a base station (BS) in a wireless communication system, the method comprising:
   performing a channel access procedure in an unlicensed band;
   determining a processing time of a user equipment (UE), based on whether to apply a cyclic-extended signal, wherein the cyclic-extended signal is a signal of channel in which entirety or portion of a transmission initiation symbol is cyclic-extended;
   after completion of the channel access procedure, transmitting, via a downlink (DL) control channel, scheduling information about uplink (UL) transmission determined based on the processing time; and
   receiving, from the UE, a control channel or a data channel.

2. The method of claim 1, wherein the processing time of the UE comprises an additional processing time for generation of the cyclic-extended signal.

3. The method of claim 2, wherein the additional processing time is determined based on at least one of a subcarrier spacing and a gap between an initiation time of the UL transmission and an end time of transmission or reception of a channel before the initiation time.

4. The method of claim 3, further comprising:
determining whether to apply the cyclic-extended signal to the UL transmission by the UE,
wherein the determining of whether to apply the cyclic-extended signal comprises determining to apply the cyclic-extended signal when the gap is equal to or greater than 16 µs, is equal to or greater than 25 µs, is equal to or greater than 16 µs+timing advance (TA), or is equal to or greater than 25 µs+TA.

5. The method of claim 2, wherein the additional processing time corresponds to a length of one symbol.

6. The method of claim 1, wherein DL control information transmitted via the DL control channel comprises initiation symbol information of the UL transmission and configuration information of the cyclic-extended signal.

7. The method of claim 6, wherein the configuration information of the cyclic-extended signal further comprises at least one of information about whether to transmit the cyclic-extended signal in the UL transmission or length information of the cyclic-extended signal.

8. The method of claim 7, wherein, when a length value of the cyclic-extended signal is configured as 0 or the length value is not configured, the cyclic-extended signal is not transmitted.

9. The method of claim 6, wherein the configuration information of the cyclic-extended signal comprises information for indicating whether to apply a processing time comprising an additional processing time for generation of the cyclic-extended signal or to apply a processing time not comprising the additional processing time for generation of the cyclic-extended signal.

10. A method performed by a user equipment (UE) in a wireless communication system, the method comprising:
receiving a downlink (DL) control channel;
obtaining scheduling information about transmission of an uplink (UL) and cyclic-extended signal transmission configuration information, based on DL control information received via the DL control channel, wherein the cyclic-extended signal is a signal of channel in which entirety or portion of a transmission initiation symbol is cyclic-extended; and
determining whether to transmit the scheduled UL, based on a reception time of the DL control channel, the cyclic-extended signal transmission configuration information, and the scheduling information.

11. The method of claim 10, wherein DL control information received via the DL control channel comprises initiation symbol information of the UL transmission and configuration information of the cyclic-extended signal.

12. The method of claim 10, wherein the scheduling information about the transmission of the UL received by the UE is based on a processing time of the UE including an additional processing time for generation of a cyclic-extended signal determined by a base station.

13. A base station (BS) of a wireless communication system, the BS comprising:
a transceiver; and
a processor coupled with the transceiver and configured to:
perform a channel access procedure in an unlicensed band,
determine a processing time of a user equipment (UE), based on whether to apply a cyclic-extended signal, wherein the cyclic-extended signal is a signal of channel in which entirety or portion of a transmission initiation symbol is cyclic-extended,
after completion of the channel access procedure, transmit, via a downlink (DL) control channel, scheduling information about uplink (UL) transmission determined based on the processing time, and receive, from the UE, a control channel or a data channel.

14. The BS of claim 13,
wherein the processing time of the UE comprises an additional processing time for generation of the cyclic-extended signal, and
wherein the additional processing time is determined based on at least one of a subcarrier spacing and a gap between an initiation time of the UL transmission and an end time of transmission or reception of a channel before the initiation time.

15. The BS of claim 13, wherein DL control information transmitted via the DL control channel comprises:
initiation symbol information of the UL transmission; and
configuration information of the cyclic-extended signal.

16. The BS of claim 15, wherein the configuration information of the cyclic-extended signal further comprises at least one of information about whether to transmit the cyclic-extended signal in the UL transmission or length information of the cyclic-extended signal.

17. A user equipment (UE) of a wireless communication system, the UE comprising:
a transceiver; and
a processor coupled with the transceiver and configured to:
receive a downlink (DL) control channel,
obtain scheduling information about transmission of an uplink (UL) and cyclic-extended signal transmission configuration information, based on DL control information received via the DL control channel, wherein the cyclic-extended signal is a signal of channel in which entirety or portion of a transmission initiation symbol is cyclic-extended, and
determine whether to transmit the scheduled UL, based on a reception time of the DL control channel, the cyclic-extended signal transmission configuration information, and the scheduling information.

18. The UE of claim 17, wherein DL control information received via the DL control channel comprises initiation symbol information of the UL transmission and configuration information of the cyclic-extended signal.

19. The UE of claim 17, wherein the scheduling information about the transmission of the UL received by the UE is based on a processing time of the UE including an additional processing time for generation of a cyclic-extended signal determined by a base station.

* * * * *